United States Patent
Shimura

(10) Patent No.: US 8,549,025 B2
(45) Date of Patent: Oct. 1, 2013

(54) INFORMATION RETRIEVAL METHOD AND APPARATUS

(75) Inventor: Shogo Shimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 286 days.

(21) Appl. No.: 12/560,488

(22) Filed: Sep. 16, 2009

(65) Prior Publication Data

US 2010/0070520 A1 Mar. 18, 2010

(30) Foreign Application Priority Data

Sep. 18, 2008 (JP) ................................. 2008-240009

(51) Int. Cl.
*G06F 17/30* (2006.01)
(52) U.S. Cl.
USPC ......................................................... 707/760
(58) Field of Classification Search
USPC ........... 707/600–831; 704/7, 9, 10; 715/201, 715/232, 243; 345/157, 162
See application file for complete search history.

(56) References Cited

U.S. PATENT DOCUMENTS

| | | | | |
|---|---|---|---|---|
| 4,228,507 A | * | 10/1980 | Leban | 715/236 |
| 5,774,834 A | * | 6/1998 | Visser | 704/10 |
| 7,917,350 B2 | * | 3/2011 | Mori et al. | 704/2 |
| 2003/0017873 A1 | * | 1/2003 | Ohara et al. | 463/42 |
| 2006/0015326 A1 | * | 1/2006 | Mori et al. | 704/9 |
| 2007/0054719 A1 | * | 3/2007 | Ohara et al. | 463/1 |
| 2007/0274704 A1 | * | 11/2007 | Nakajima et al. | 396/310 |

FOREIGN PATENT DOCUMENTS

| | | |
|---|---|---|
| JP | 62-257570 A | 11/1987 |
| JP | 2006-099677 | 4/2006 |
| JP | 2006-236201 | 9/2006 |

OTHER PUBLICATIONS

Flanagan et al., Unsupervised clustering of symbol strings and context recognition, 2002, IEEE, 171-178.*
Japanese Office Action mailed Dec. 18, 2012 for corresponding Japanese Application No. 2008-240009, with Partial English-language Translation.

* cited by examiner

*Primary Examiner* — Jean B Fleurantin
(74) *Attorney, Agent, or Firm* — Fujitsu Patent Center

(57) ABSTRACT

An information retrieval method includes inputting a symbol string, specifying an arbitrary position in the input symbol string, changing a symbol in the specified position in the symbol string and changing the symbol string into a symbol string which is positioned before or after in a specified arrangement order.

9 Claims, 26 Drawing Sheets

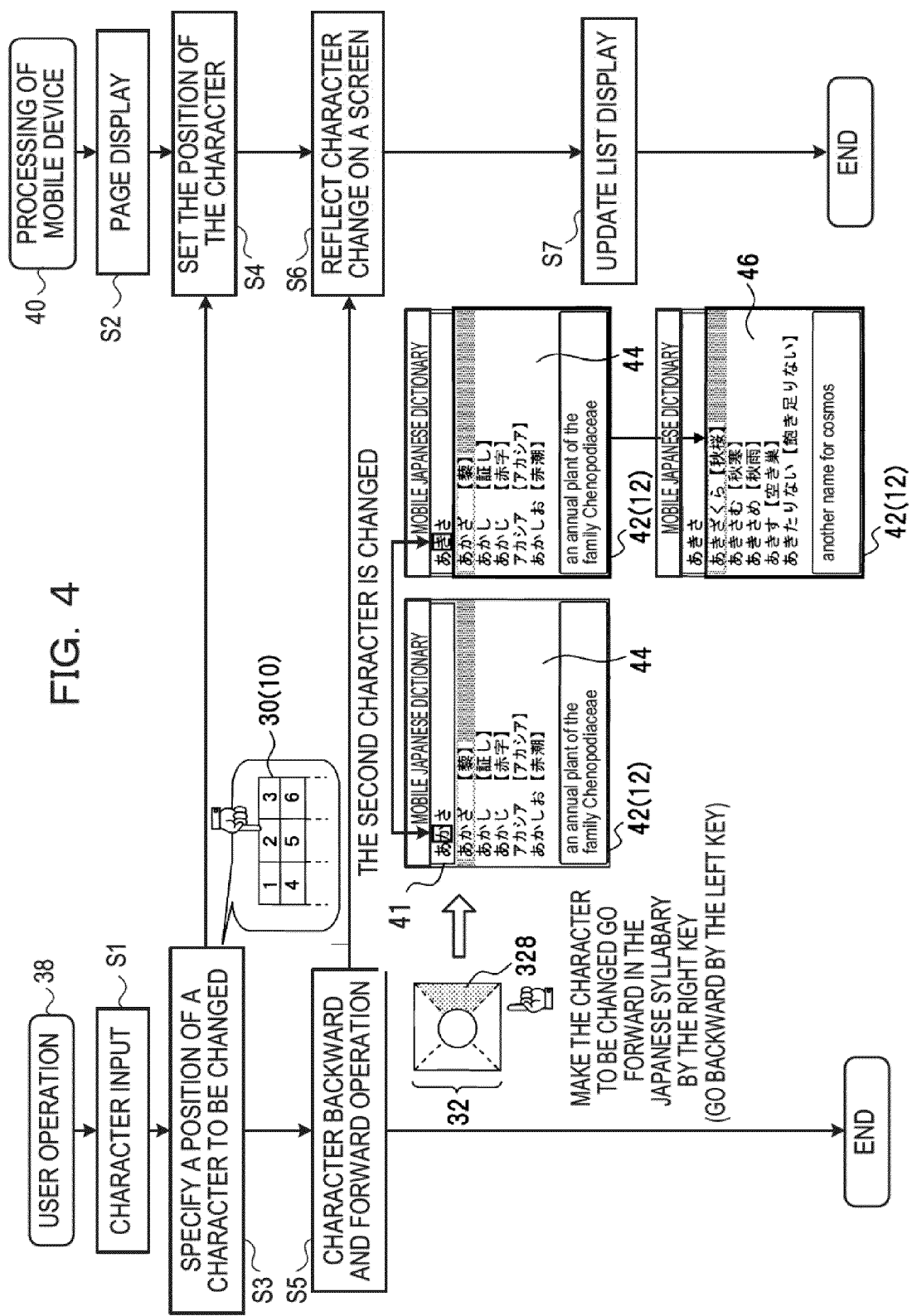

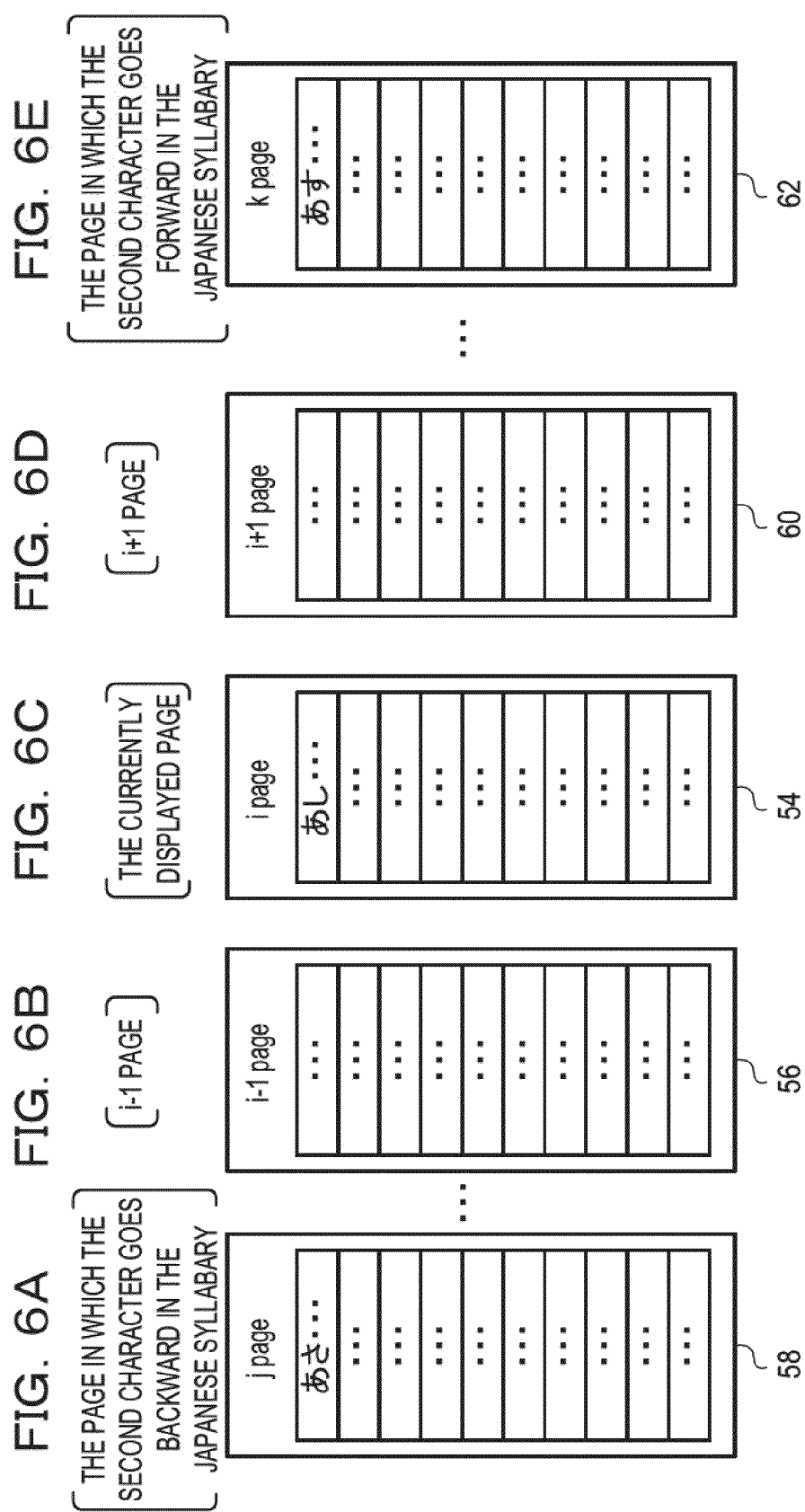

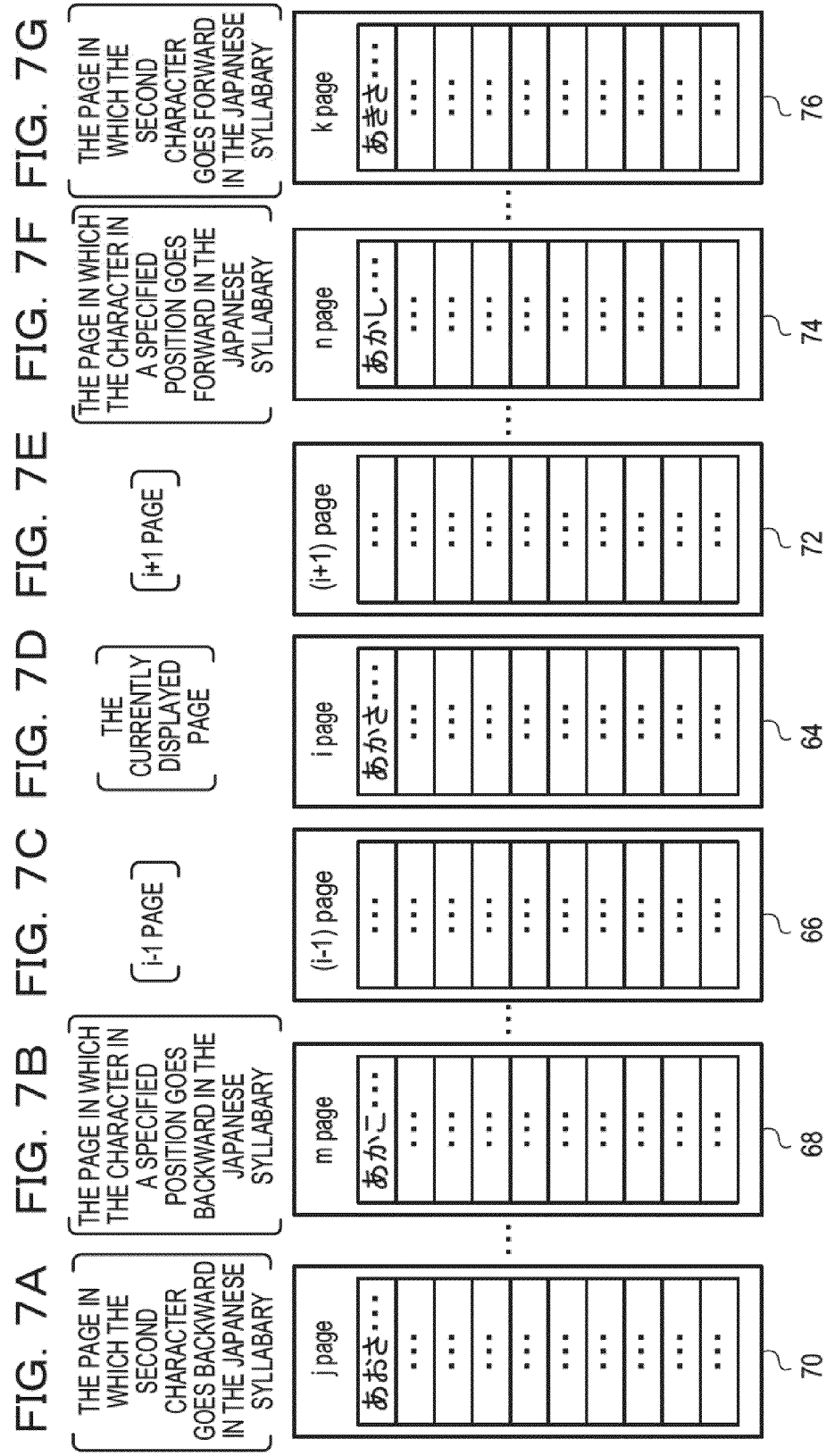

THE NUMBER OF WORDS TO BE LIST-DISPLAYED IS (x-1)

THE WORD THAT IS OBTAINED WHEN THE SECOND CHARACTER GOES FORWARD

THE WORD POSITIONED CLOSEST TO THE WORD "あきさ"

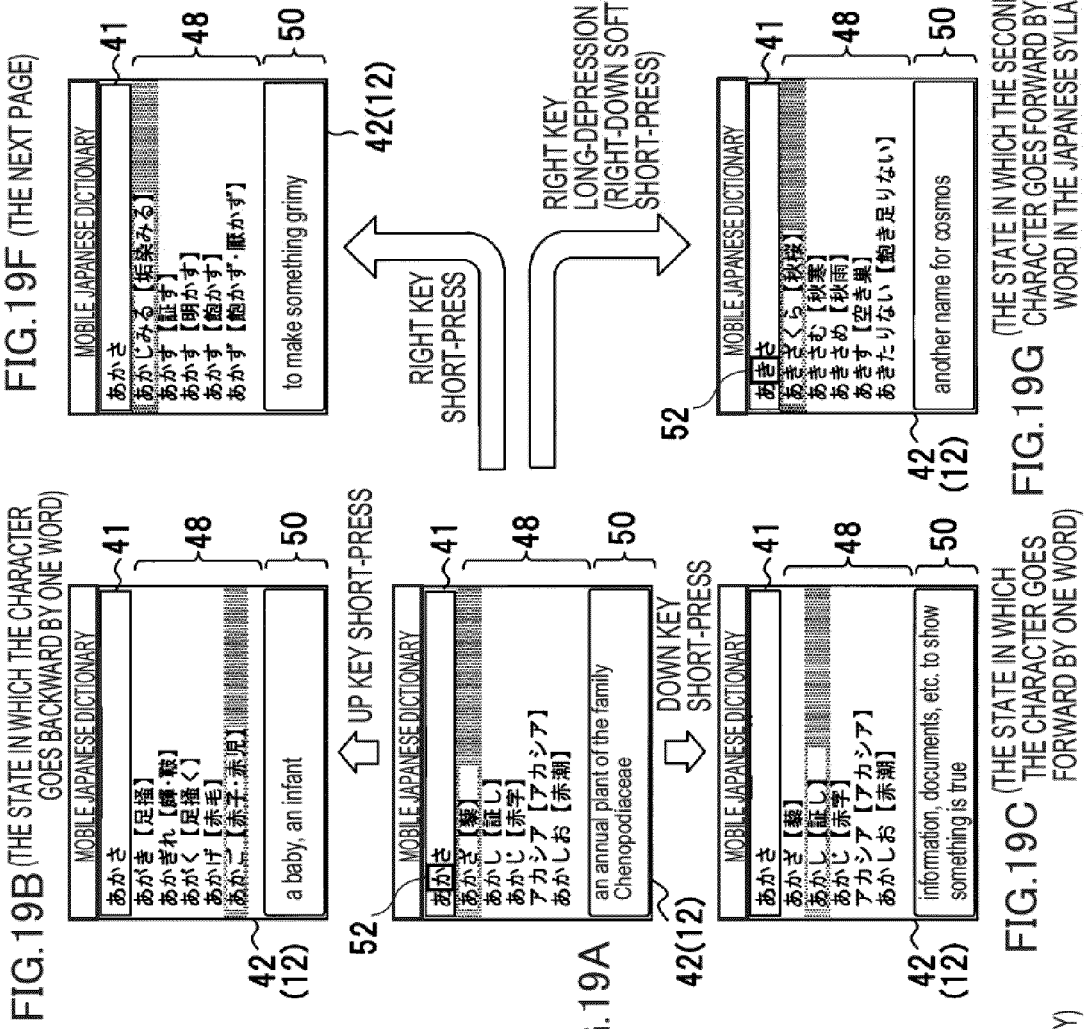

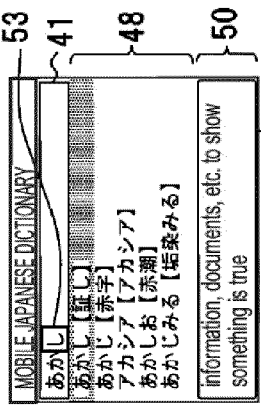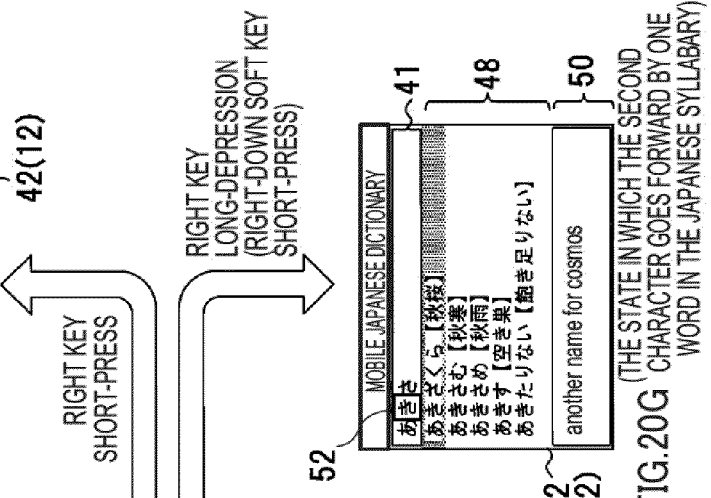
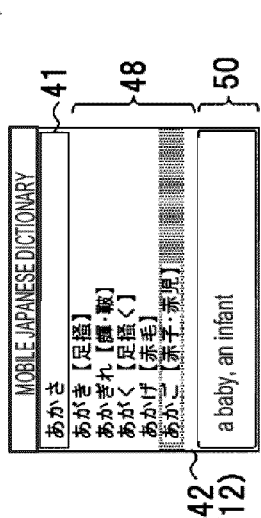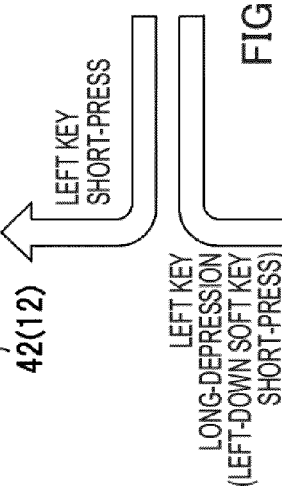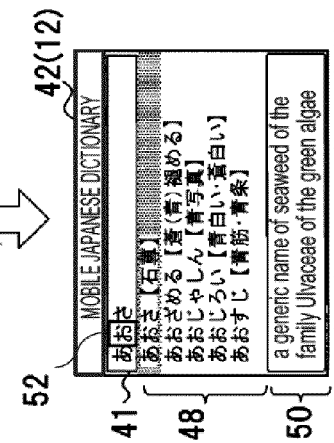
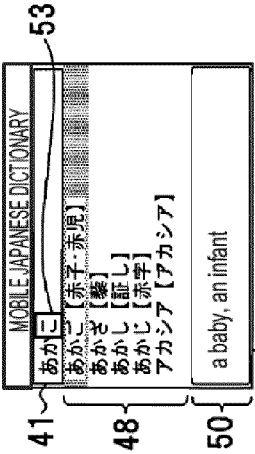

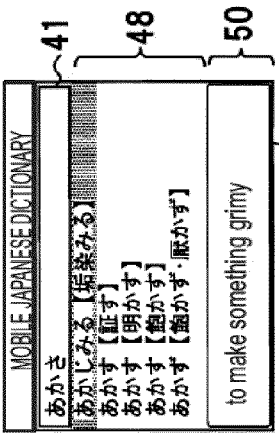
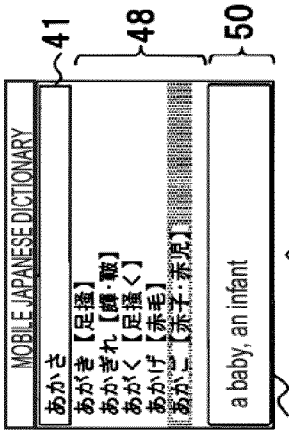
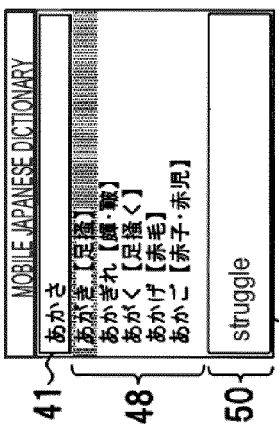
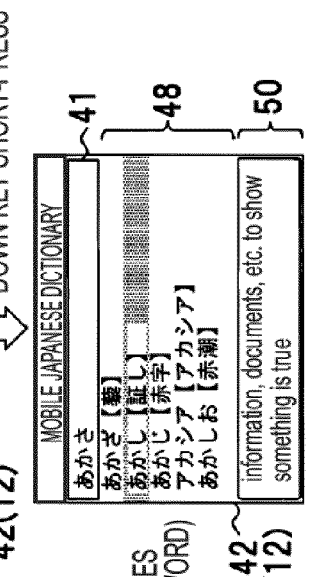
FIG. 21E (THE NEXT PAGE)
FIG. 21B (THE STATE IN WHICH THE CHARACTER GOES BACKWARD BY ONE WORD)
FIG. 21A
FIG. 21C (THE STATE IN WHICH THE CHARACTER GOES FORWARD BY ONE WORD)
FIG. 21D (THE PREVIOUS PAGE)

FIG. 22

| | OPERATION | NUMBER OF OPERATIONS |
|---|---|---|
| COMPARISON EXAMPLES | 1. Prepare a state in which a character may be input.<br>2. Delete the final character.<br>3. Press a key one time to input a letter.<br>4. Determine an input word by a determination key and go back to the list. | 4 |
| THE PRESENT EMBODIMENTS | 1. Specify a position of a character to be changed by pressing of a numeric key.<br>2. Make the character go backward or forward in the Japanese syllabary by the right key or the left key | 2 |

INFORMATION RETRIEVAL METHOD AND APPARATUS

CROSS-REFERENCE TO RELATED APPLICATION

This application is based upon and claims the benefit of priority of the prior Japanese Patent Application No. 2008-240009, filed on Sep. 18, 2008, the entire contents of which are incorporated herein by reference.

FIELD

The present invention relates to information retrieval broadcasting and an information retrieval apparatus based on information input or the input for retrieving a symbol string composed of words, characters, and other symbols. The present invention relates to an information retrieval method and an information retrieval apparatus for retrieving information by, for example, changing the symbol string based on position specification in the symbol string.

BACKGROUND

In a conventional technique, to retrieve a word composed of a character string of a plurality of characters, the reading of the word is input. A character related to the word and a character in the word may be changed. In this case, the following operations are performed:

a. Re-input the word to be retrieved.
b. Select the next word or the previous word in the Japanese syllabary (or alphabetical order).
c. Select skipping of a specified number of words in the Japanese syllabary (or alphabetical order), etc.

In the above-described operation c, a page is turned to the next page or is returned to the previous page. If there is a gap between a displayed character and a character to be retrieved, the above-described operations are repeated. This may cause trouble for a user.

Japanese Laid-Open Patent Publication No. 2006-99677 discloses that a character or a word included in a desired entry word and a position of the character or the word in the desired entry word are specified in a condition and the entry word that is satisfied with this condition is displayed. Japanese Laid-Open Patent Publication No. 2006-99677 discloses that a user specifies a kanji and a character indicating a character position in an entry word of the kanji and the entry word is determined and then a list of the entry words is classified and displayed.

Japanese Laid-Open Patent Publication No. 2006-236201 discloses that, as a character retrieval function for specifying a character position to be changed, dictionary data is retrieved by using a leading character string, which is specifically indicated in hiragana, out of character strings to be read by processing for extracting a candidate.

To change a character in an arbitrary position in a word, the user inputs a new word. This causes trouble for the user. In an operation for selecting the next word or the previous word one after another instead of inputting characters, the user may reach to a desired word by repeating this operation. However, the user may become tired when repeating this operation. This is because the user is required to pay attention to key operations for selection and to changing words if there are many words between the currently displayed word and the desired word. This causes trouble and takes time for the user to select the word.

With reference to FIG. 25A, FIG. 25B, and FIG. 26B, the above-described selection operation will be described. FIG. 25A and FIG. 25B are diagrams illustrating a conventional selection operation of a character string. FIG. 26 is a diagram illustrating another selection operation of a character string by conventional page change.

In the dictionary, after retrieving the character string, for example, "あし ..." in ten words displayed as illustrated in FIG. 25B, when the user retrieves "あす ..." that is close to the word "あし ..." successively as illustrated in FIG. 25A, there are many words between "あし ..." and "あす ..." if the second and following characters are arranged in the Japanese syllabary (or alphabetical order). For example, the number of the words may be hundreds. For example, if there are five hundred words between "あし ..." and "あす ..." five hundred key operations may be required if the user selects each word in between. As illustrated in FIG. 26, even though a page changing method may be performed, approximately fifty page changes are required to reach page Pn with "あす ..." from page P1 with "あし ...."

Even though the existence of the above-described words may be expected to some extent, the user usually believes that he/she may reach a desired word by updating and selecting the words one after another, so that the user does not usually retype the word intuitively. The above-described operation and repeat of the operation may require a large number of operations to be performed in the end.

As for a cache of a word list, when character input is performed, it is unpredictable what kind of character string is input. Thus, a cache of the page to be displayed next is difficult to be performed. Loading may not be performed unless the word is determined. Thus, page display is delayed and the processing requires more time.

SUMMARY

According to an aspect of the invention, an information retrieval method includes inputting a symbol string; specifying an arbitrary position in the input symbol string; and changing a symbol in the specified position in the symbol string and changing the symbol string into a symbol string which is positioned before or after in a specified arrangement order.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 is a flowchart illustrating a processing procedure of character change in a word, FIG. 6A to FIG. 6E are diagrams illustrating page processes in a case where a character position to be changed is specified, FIG. 7A to FIG. 7G are diagrams illustrating page processes in a case where a character position to be changed is not specified, FIG. 19A to FIG. 19G are diagrams illustrating a character change in a word, FIG. 20A to FIG. 20G are diagrams illustrating another character change in a word, FIG. 21A to FIG. 21E are diagrams illustrating a character change of a comparison example and a word group change, FIG. 22 is a diagram illustrating a comparison of the numbers of operations.

DESCRIPTION OF THE EMBODIMENTS

First Embodiment

Figure 1:
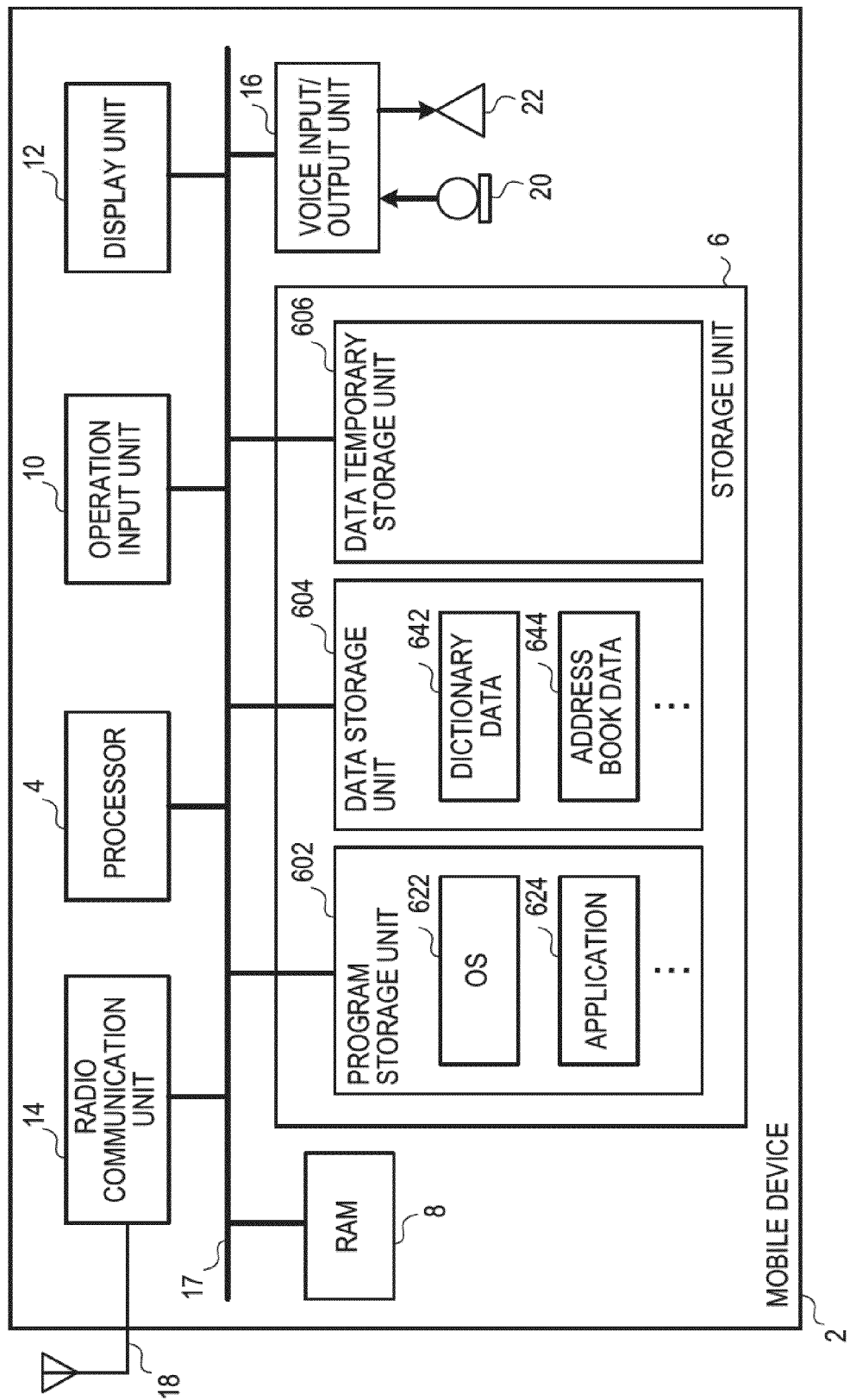
FIG. 1 is a diagram illustrating a hardware configuration of a mobile device.
Figure 2:
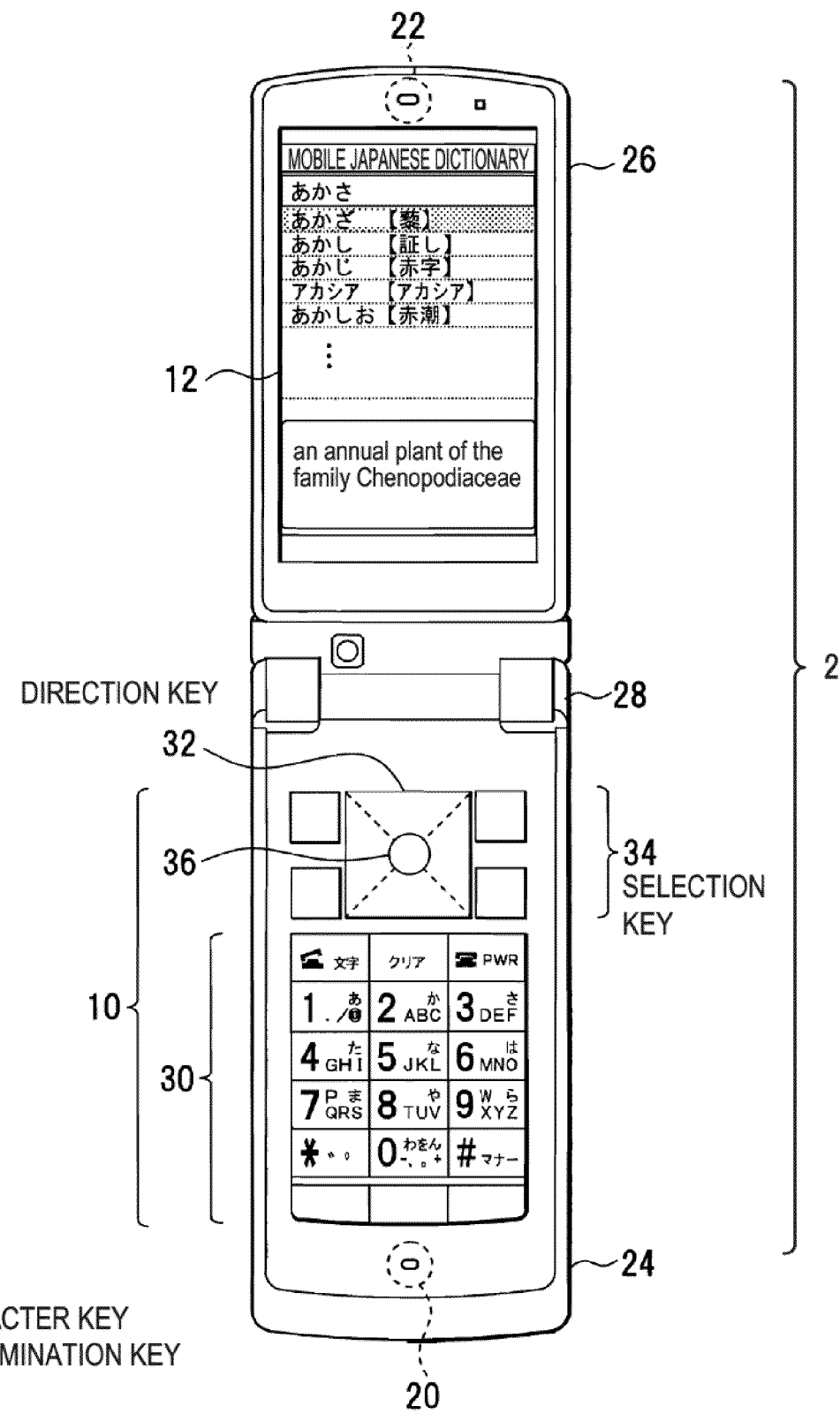
FIG. 2 is a diagram illustrating a mobile device.
Figure 3:
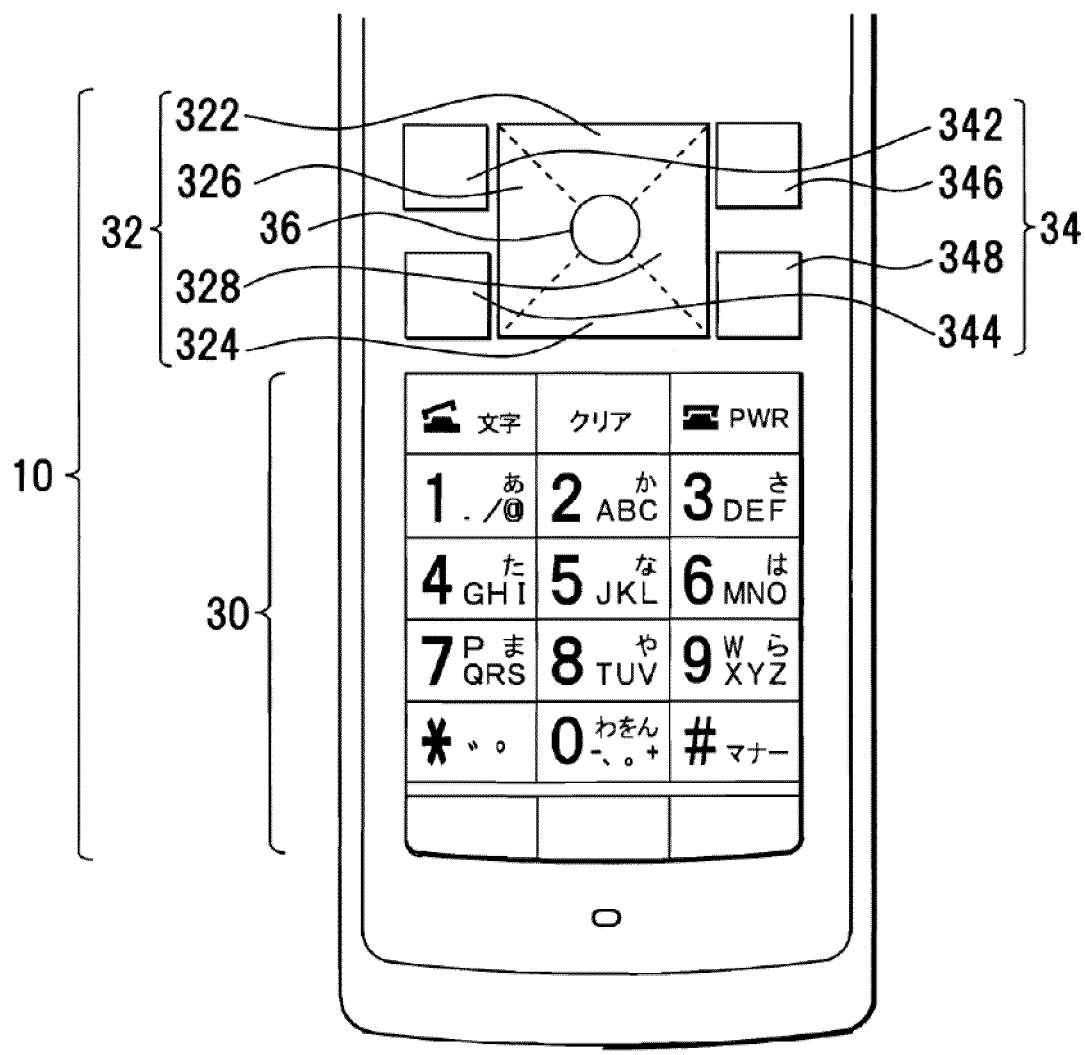
FIG. 3 is a diagram illustrating an operation input unit that is enlarged and displayed.

With reference to FIG. 1, FIG. 2, and FIG. 3, a first embodiment will be described. FIG. 1 is a diagram illustrating a hardware configuration of a mobile device. FIG. 2 is a diagram illustrating a mobile device. FIG. 3 is a diagram illustrating an operation input unit that is enlarged and displayed. The configurations illustrated in FIG. 1 and FIG. 3 are examples. The present invention is not limited to the examples.

The mobile device 2 is an example of an information processing apparatus that includes an information retrieval method and an information retrieval apparatus. By an easy operation such as pressing numeric keys, the mobile device 2 specifies an arbitrary position in a word as an example of a symbol string and changes the character in the specified position. The mobile device 2 makes the character in the specified position go backward or forward in the Japanese syllabary (or alphabetical order), for example, as in a specified arrangement order of the words, displays the change result, and immediately updates the list display. In this case, after the arbitrary position in the word is specified, the character in the specified position goes backward or forward in the arrangement order by an operation different from the operation for position specification. A symbol string mainly includes a plurality of symbols. The symbols composing a symbol string may be a character, a number, a figure other than a character, a symbol used for communication, and/or other identification information. The character may be, for example, hiragana, a kanji idiom, or foreign language letters such as English letters.

As illustrated in FIG. 1, the mobile device 2 includes a processor 4, a storage unit 6, a Random Access Memory (RAM) 8, an operation input unit 10, a display unit 12, a radio communication unit 14, and a voice input/output unit 16.

The processor 4 executes an Operating System (OS) and applications in the storage unit 6. The processor 4 executes a character change program and a subroutine of the program. The processor 4 corresponds to a control unit, a calculation unit, and the like that execute the above-described processes. The processor 4 corresponds to a position specification unit that specifies a position of a character in an arbitrary position in a character string that is input by the operation input unit 10. Based on a changing operation of the character in the specified position, the processor 4 further corresponds to a changing unit that changes the character string by changing a character into a character that is positioned before or after in the Japanese syllabary or an alphabet, for example, as the arrangement order of the character string.

The storage unit 6 is an example of a storage unit composed of a recording medium and includes a program storage unit 602, a data storage unit 604, and a data temporary storage unit 606. The program storage unit 602 stores an OS 622 and an application 624. The application 624 includes the above-described character retrieval program and the subroutine of the program. The data storage unit 604 stores dictionary data 642 and address book data 644 as independent databases. The RAM 8 is a work area. The data temporary storage unit 606 temporally stores data. The data temporary storage unit 606 reads out, from the data storage unit 604, data of a page and a word group that are expected to be retrieved. The data temporary storage unit 606 may be, for example, a cache memory.

The operation input unit 10 may be a keyboard as an example of an information input unit for inputting a character, a character string such as a word, position specification, position specification operation, or the like. The keyboard has character keys such as numeric keys, a direction key, a determination key, a software key, and the like. The operation input unit 10 corresponds to an input unit that inputs a character string and to an information input unit such as a specification operation unit that specifies a character position. The character keys used to input numbers are used to specify a position in a word.

The display unit 12 may be, for example, a Liquid Crystal Display (LCD), as an example of a display unit to display information. Under control of the processor 4, the display unit 12 displays a character string, a character string to be changed, a specified position in which a character is changed, and the like.

The radio communication unit 14 is a communication unit that performs data communication such as voice communication, mail, and World Wide Web (WWW) page viewing, and performs radio communication with a base station through an antenna 18. The radio communication unit 14 allows the mobile device 2 to have a telephone function and a communication function.

The voice input/output unit 16 inputs or outputs telephone voice and the like. A voice signal is input through a microphone 20. The voice signal, demodulated from the radio signal received by the radio communication 14, is output from a receiver 22.

As illustrated in FIG. 2, the mobile device 2 has a configuration in which a housing unit 24 and a housing unit 26 are linked together to be foldable by a hinge unit 28. The housing unit 24 is provided with the operation input unit 10 and the microphone 20. The housing unit 26 is provided with the display unit 12 and the receiver 22. The operation input unit 10 includes character keys 30, a direction key 32, a selection key 34, and a determination key 36. The character keys 30 may also be used as numeric keys for dial input.

As illustrated in FIG. 3, as a unit that inputs direction specification information for up and down or right and left, the direction key 32 includes an up key 322, a down key 324, a left key 326, and a right key 328. The direction key 32 is used as a unit that changes a character string in the arrangement order. As a unit that inputs direction specification information, the selection key 34 includes a left-up soft key 342, a left-down soft key 344, a right-up soft key 346, and a right-down soft key 348. The selection key 34 is also used to change a character string in the arrangement order.

With reference to FIG. 4, description will made of a character change in a word. FIG. 4 is a flowchart illustrating a processing procedure of character change in a word. FIG. 4 is an example of a mobile device, but the present invention is not a limited to a mobile device.

This processing procedure includes both a user operation 38 and a corresponding process 40 on the mobile device 2. In the processing procedure, the mobile device 2 is started by the user operation 38 as a trigger. According to the present embodiment, the user selects a dictionary from a menu display and starts a mobile Japanese dictionary. By performing input operation in an input column of the mobile Japanese dictionary with the operation input unit 10, the user inputs a word as an example of a symbol string to be retrieved (Step S1). The input column of the mobile Japanese dictionary may be, for example, a text box. In response to this input, a page of a word group of a plurality of words that include the word input in the display unit 12 of the mobile device 2 is displayed (Step S2). The number of the words in the word group may be, for example, ten.

The user presses the character (numeric) key 30 as the position specification unit that specifies a position in a word to specify the position in the word to be changed (Step S3). This position specification sets the position of the character (Step S4). The user performs character backward and forward operation (Step S5), and presses the right key 328 to change the character in the specified position in the Japanese syllabary (or alphabetical order) as an example of the arrangement order. Instead of the right key 328, if the left key 326 is pressed, the position goes backward to the previous character. By the character backward and forward operation, character change is reflected on a screen (Step S6) and the list of words is updated according to this process (Step S7).

Figure 5A:
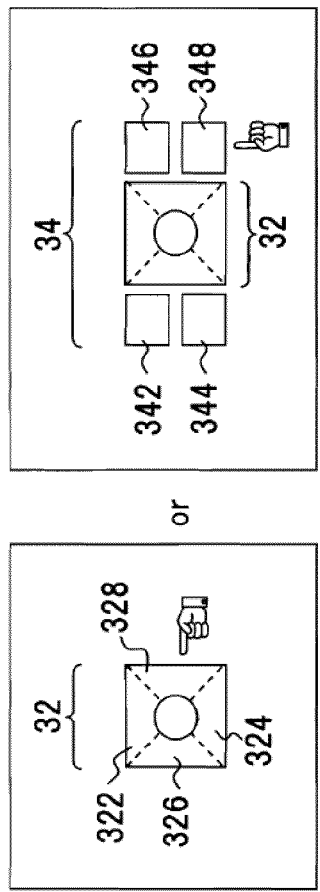
FIG. 5A and FIG. 5B are diagrams illustrating user operations and operations of a mobile device.
Figure 5B:
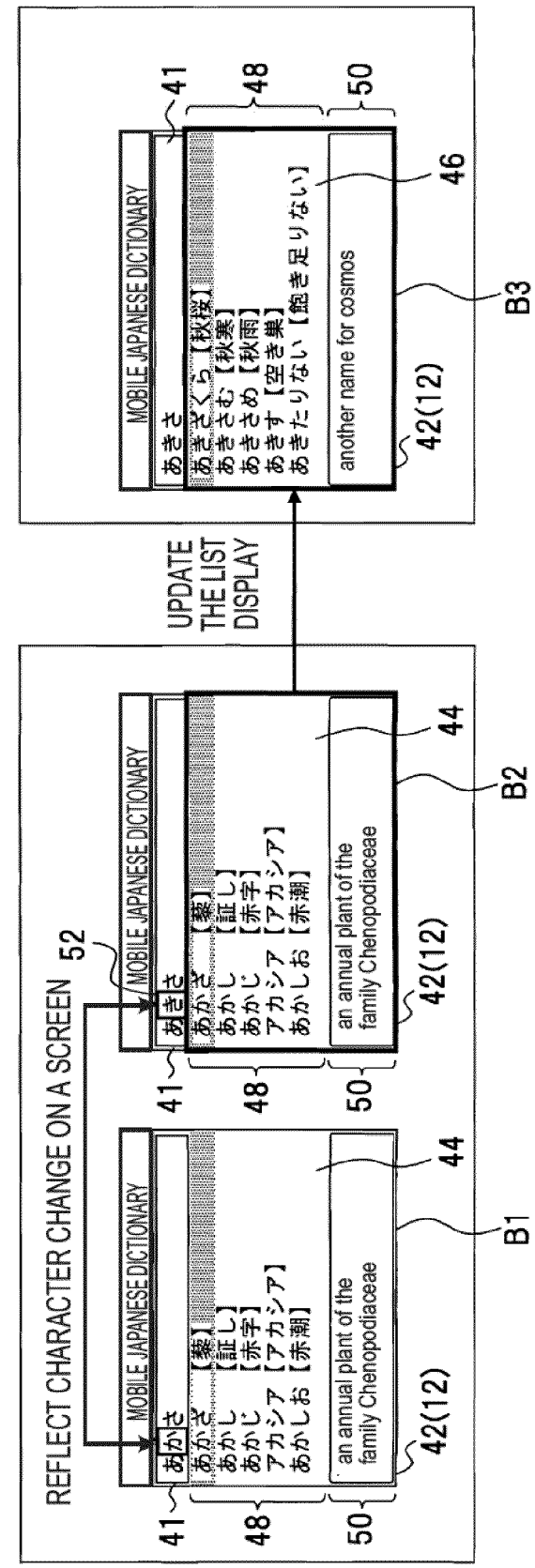

With reference to FIG. 5A and FIG. 5B, description will be made of specification of character position and operation of the specification. FIG. 5A and FIG. 5B are diagrams illustrating operations of a user operation and a mobile device. FIG. 5A and FIG. 5B are examples of a mobile device. The present invention is not limited to a mobile device. In FIG. 5A and FIG. 5B, the same parts as in FIG. 3 and FIG. 4 are indicated with the same numerals.

As illustrated in FIG. 5A, the user specifies the position of the character to be changed by using the direction key 32 or the selection key 34. To use the direction key 32, the user may press the right key 328 for a long time. To use the selection key 34, the user may press the right-down soft key 348. According to the present embodiment, with a long key press of the right key 328 or a short key press of the right-down soft key 348, the second character may go forward in the Japanese syllabary. According to the present embodiment, with a long key press of the left key 326 or a short key press of the left-down soft key 344, the second character may go backward.

According to the present embodiment, if the right key 328 for the next process is pressed, the display of the character is changed from the final character in the Japanese syllabary (or alphabetical order) into the first character in the Japanese syllabary (or alphabetical order). For example, if the right key 328 is pressed with respect to "ん," the display of the character is changed into "あ." For example, if the right key 328 is pressed with respect to "Z," the display of the character is changed into "A." Meanwhile, if the right key 328 for the previous process is pressed, the display of the character is changed from the first character in the Japanese syllabary (or alphabetical order) into the final character in the Japanese syllabary (or alphabetical order). For example, if the left key 326 is pressed with respect to "あ," the display of the character is changed into "ん." For example, if the left key 326 is pressed with respect to "A," the display of the character is changed into "Z."

According to the present embodiment, the position of the second character in "あかさ" in the input column 41 in Page 44 displayed on a display screen 42. When "あかさ" in the input column 41 is changed into "あきさ," Page 46 updated in the list display corresponding to this "あきさ" is displayed.

For specification of character position, change of the character, and update of the list display, as illustrated in B1 of FIG. 5B, if "あかさ" is input into the input column 41, the list display column 48 displays the following words corresponding to the word "あかさ":

あかざ (AKAZA) (wild spinach) [藜]
あかし (AKASHI) (proof) [証し]
あかじ (AKAJI) (deficit) [赤字]
アカシア (AKASHIA) (acacia) [アカシア]
あかしお (AKASHIO) (red tide) [赤潮]

The above-described display and the similar display described in the present specification below are represented in the following order from the left: Japanese, Roman letters, English, and Kanji (or Kana).

A word meaning column 50 in the lower side of the list display column 48 displays "an annual plant of the family Chenopodiaceae" as the meaning of the word "あかざ" the position of the cursor.

The second character to be changed in "あかさ" in the input column 41 is specified to a position 52. As illustrated in B2 of FIG. 5B, "か" in "あかさ" is changed into "き" by the direction key 32, so that the display in the input column 41 is "あきさ."

In response to the display in the input column 41 changing into "あきさ," the above-described word group from "あかざ[藜]" to "あかしお[赤潮]" in the list display column 48 is updated. As illustrated in B3 of FIG. 5B, the list display column 48 displays the updated word group as follows:

あきざくら (AKIZAKURA) (cosmos) [秋桜]
あきさむ (AKISAMU) (autumn coldness) [秋寒]
あきさめ (AKISAME) (autumn rain) [秋雨]
あきす (AKISU) (thief) [空き巣]
あきたりない (AKITARINAI) (dissatisfied) [飽き足りない]

The word meaning column 50 in the lower side of the list display column 48 displays "another name for cosmos" as the meaning of the word "あ きざくら" in the position of the cursor. That is, the word meaning column 50 is updated all at once.

As for the above-described position setting, there are examples of modifications as follows:

(1) To set the changed position in the character, if a value that is larger than the value of the length of an already-input word is selected, the position of the character to be changed is set to the final character of the already-input word.

(2) At the time of the position setting, to specify the value with two or more digits, a user presses numeric keys two or more times. To specify "12," the user presses the numeric key "1" and then presses the numeric key "2." This is the same as a regular input operation.

(3) In spite of whether or not the setting operation of the position of the character is performed, the second character is changeable by a specific operation. The specific operation for the second character may be, for example, a long key press the right and left keys or pressing the right-down and left-down soft keys. When the specific operation is performed, the second character goes backward or forward in the Japanese syllabary (or alphabetical order), and the list display is updated immediately (FIG. 5B).

With reference to FIG. 6A to FIG. 6E and FIG. 7A to FIG. 7G, description will be made of a data cache. FIG. 6A to FIG. 6E are diagrams illustrating a page process in a case where the character position to be changed is not specified. FIG. 7A to FIG. 7G are diagrams illustrating another page processing in a case where the character position to be changed is specified. The processes illustrated in FIG. 6A to FIG. 6E and FIG. 7A to FIG. 7G are examples. The present invention is not limited to the examples.

If the data of a display candidate is cached, the speed of update of the list display may be increased. If there are six types of data to be cached (FIG. 7A, FIG. 7B, FIG. 7C, FIG. 7E, FIG. 7F, and FIG. 7G), it is possible to cache all of the display candidates to be displayed next.

If the character position to be changed is not set, the page that may be displayed by the next operation is the previous page or the next page of the currently displayed page, or the pages in which the second character goes backward or forward. Thus, four types of pages may be cached. For example, the currently displayed page is i page 54 (FIG. 6C). The page before i page 54" is (i−1) page 56 (FIG. 6B). The page in which the second character from the front goes backward in the Japanese syllabary is j page 58 (FIG. 6A). The page next to the i page 54 (FIG. 6C) is (i+1) page 60 (FIG. 6D). The page in which the second character from the front goes forward in the Japanese syllabary is k page 62 (FIG. 6E). In the present embodiment, four types of pages are cached: (i−1) page 56 (FIG. 6B), j page 58 (FIG. 6A), (1+1) page 60 (FIG. 6D), and k page 62 (FIG. 6E).

If the character position to be changed is set, the page that may be displayed by the next operation may be the page in which the character in the specified position goes backward or forward in addition to the above-described four types of pages. Thus, those six types of pages may be cached. For example, the currently displayed page is i page 64 (FIG. 7D). The page before i page 64 (FIG. 7D) is (i−1) page 66 (FIG. 7C). The page in which the third character from the front goes backward in the Japanese syllabary is m page 68 (FIG. 7B). The page in which the second character from the front goes backward in the Japanese syllabary is j page 70 (FIG. 7A). The next page of i page 64 (FIG. 7D) is (i+1) page 72 (FIG. 7E). The page in which the third character from the front goes forward in the Japanese syllabary is n page 74 (FIG. 7F). The page in which the second character from the front goes forward is k page 76 (FIG. 7G).

Figure 8:
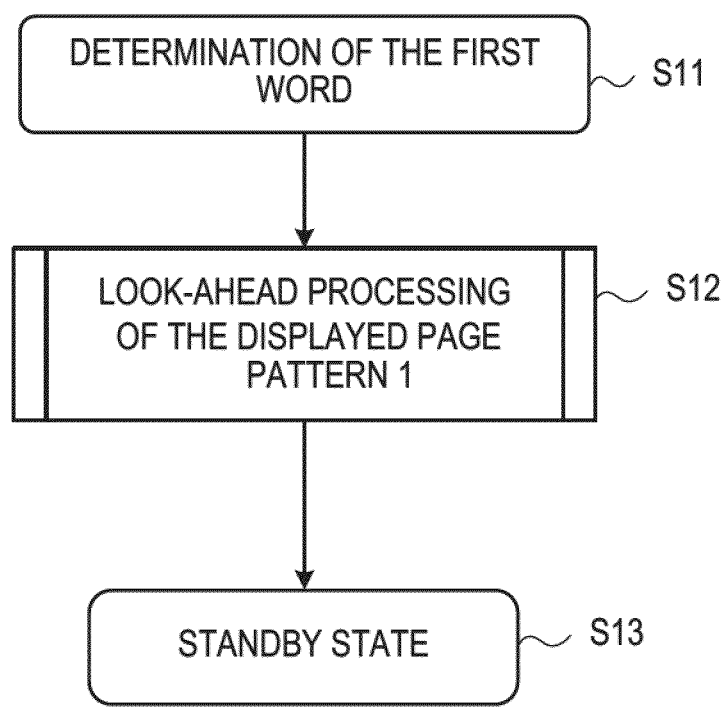
FIG. 8 is a flowchart illustrating processing procedure of operations in a standby state.
Figure 9:
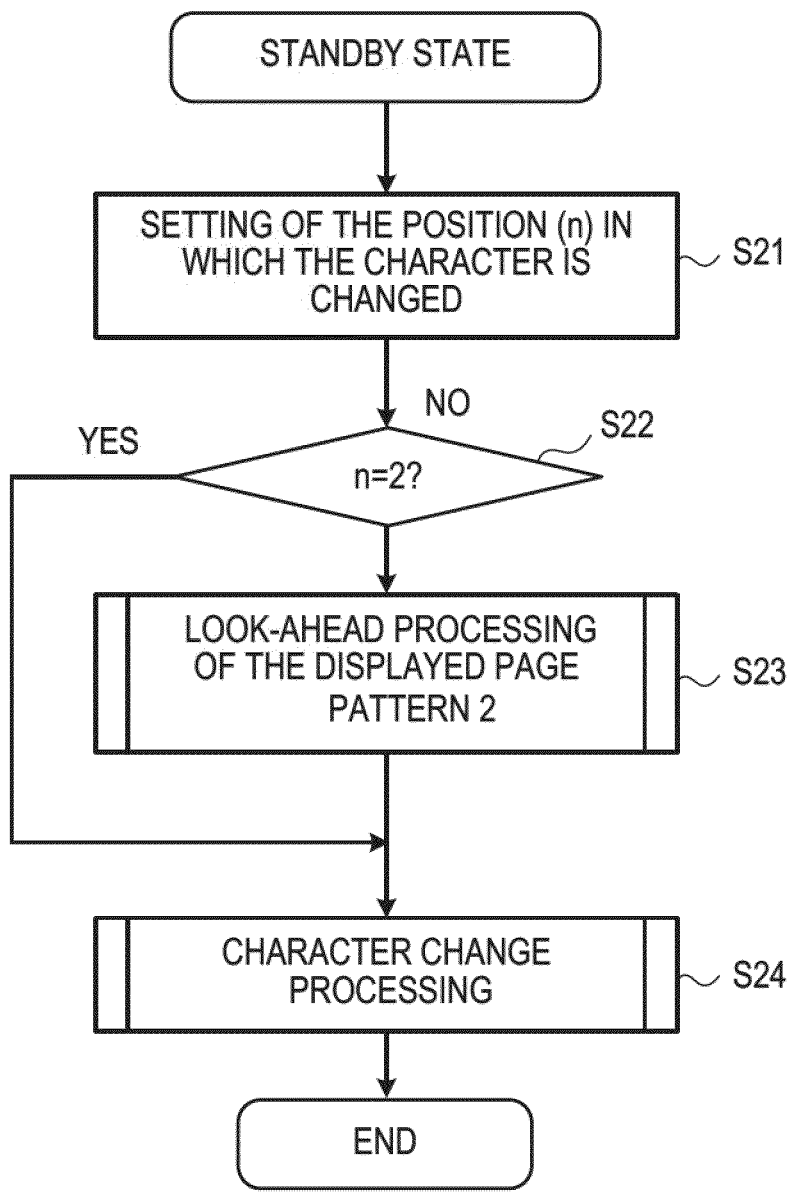
FIG. 9 is a flowchart illustrating processing procedure of a character change in a specified position.
Figure 10:
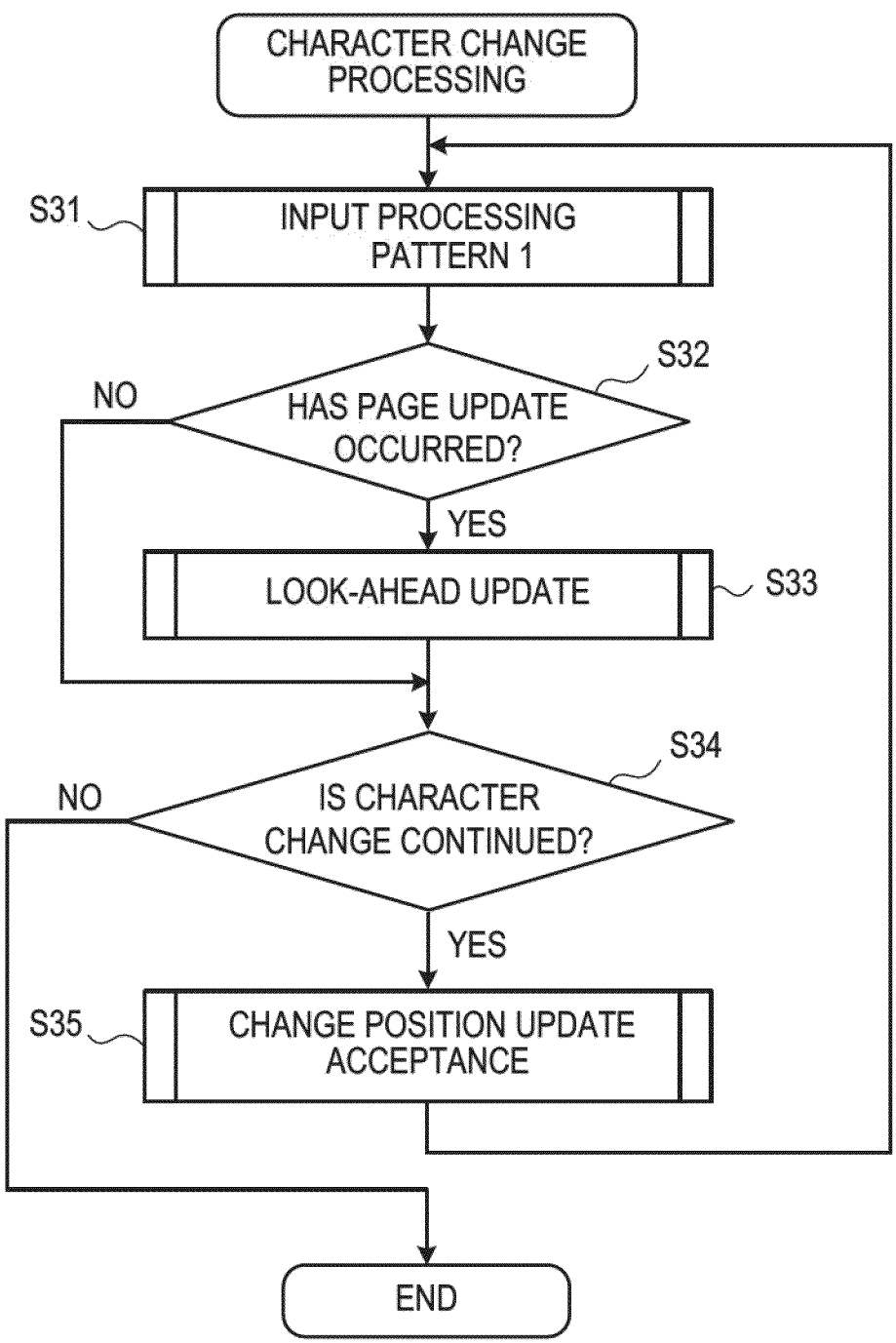
FIG. 10 is a flowchart illustrating another processing procedure of a character change in a specified position.
Figure 11:
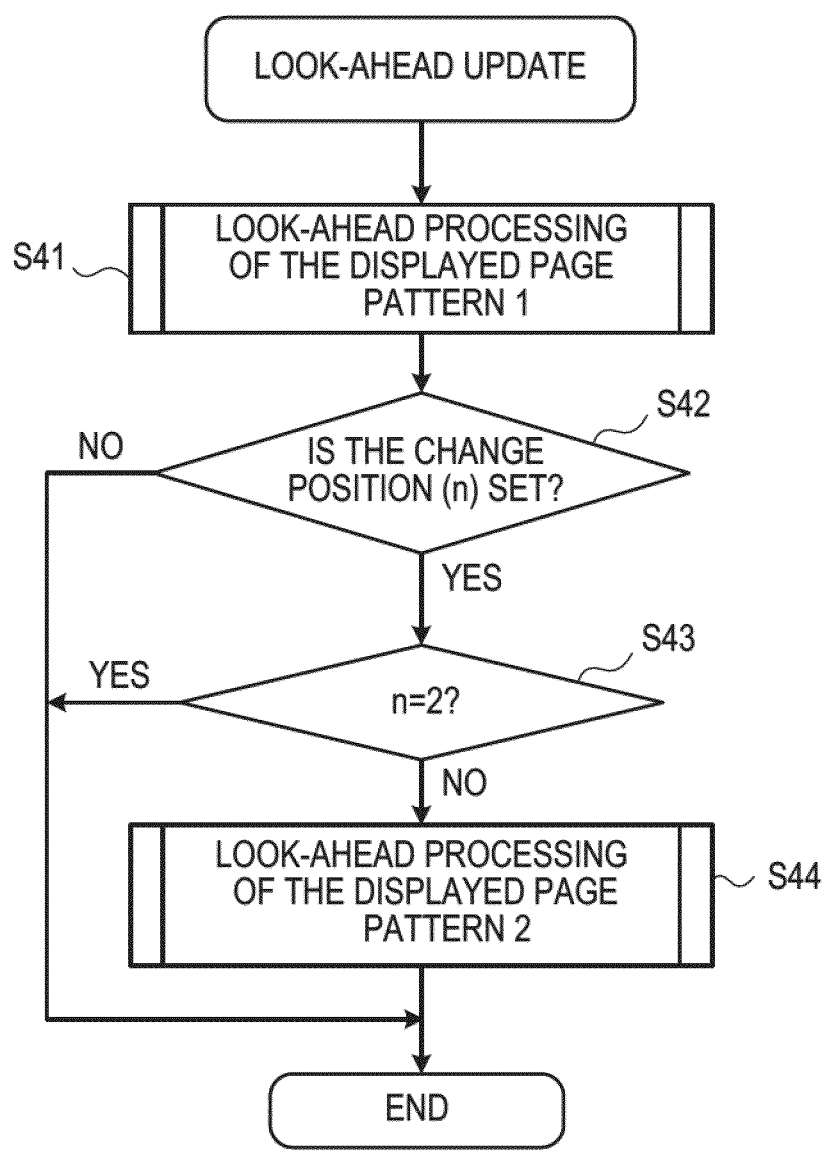
FIG. 11 is a flowchart illustrating processing procedure of a look-ahead update.
Figure 12:
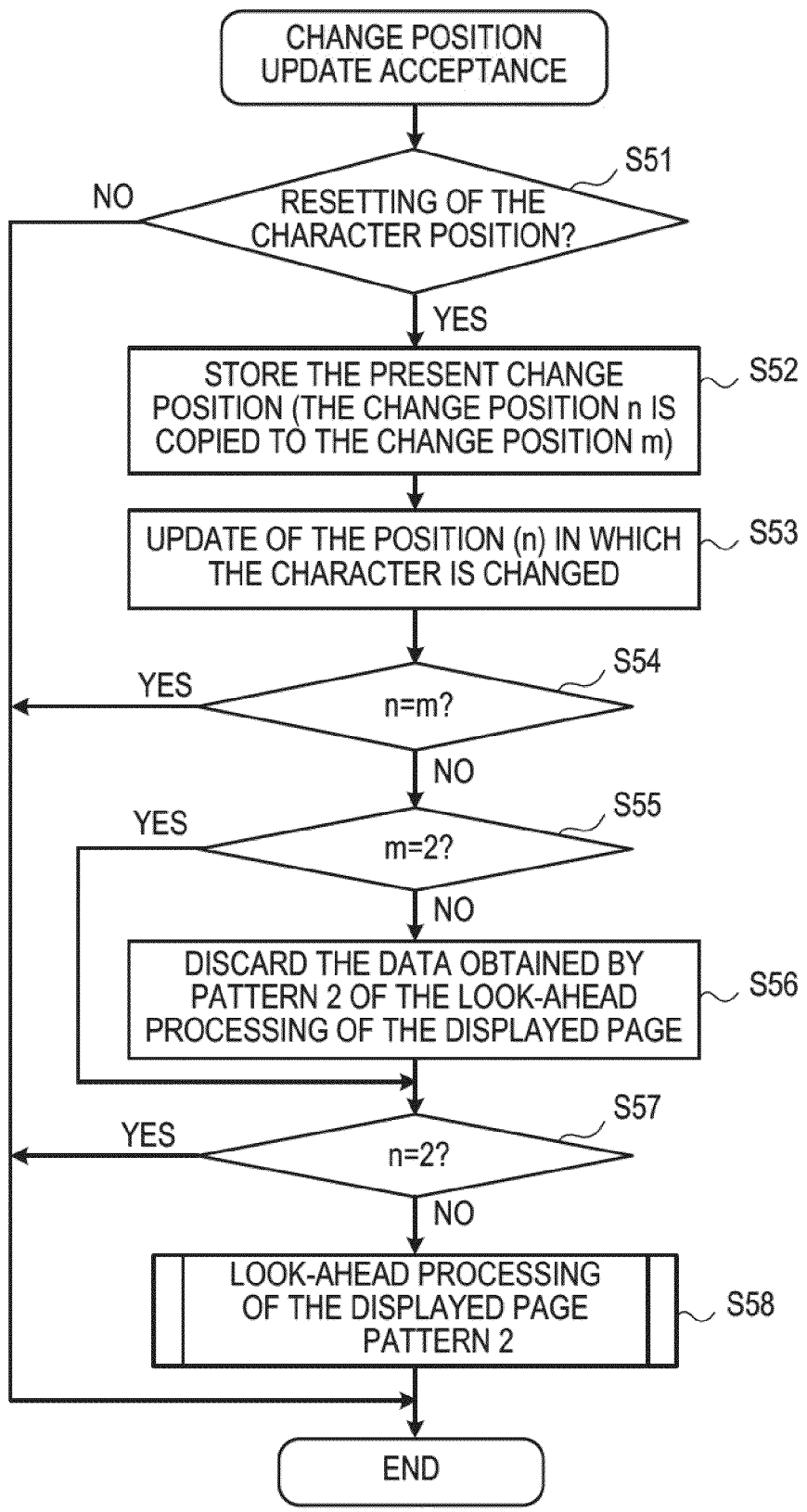
FIG. 12 is a flowchart illustrating processing procedure of a change position update acceptance.
Figure 13:
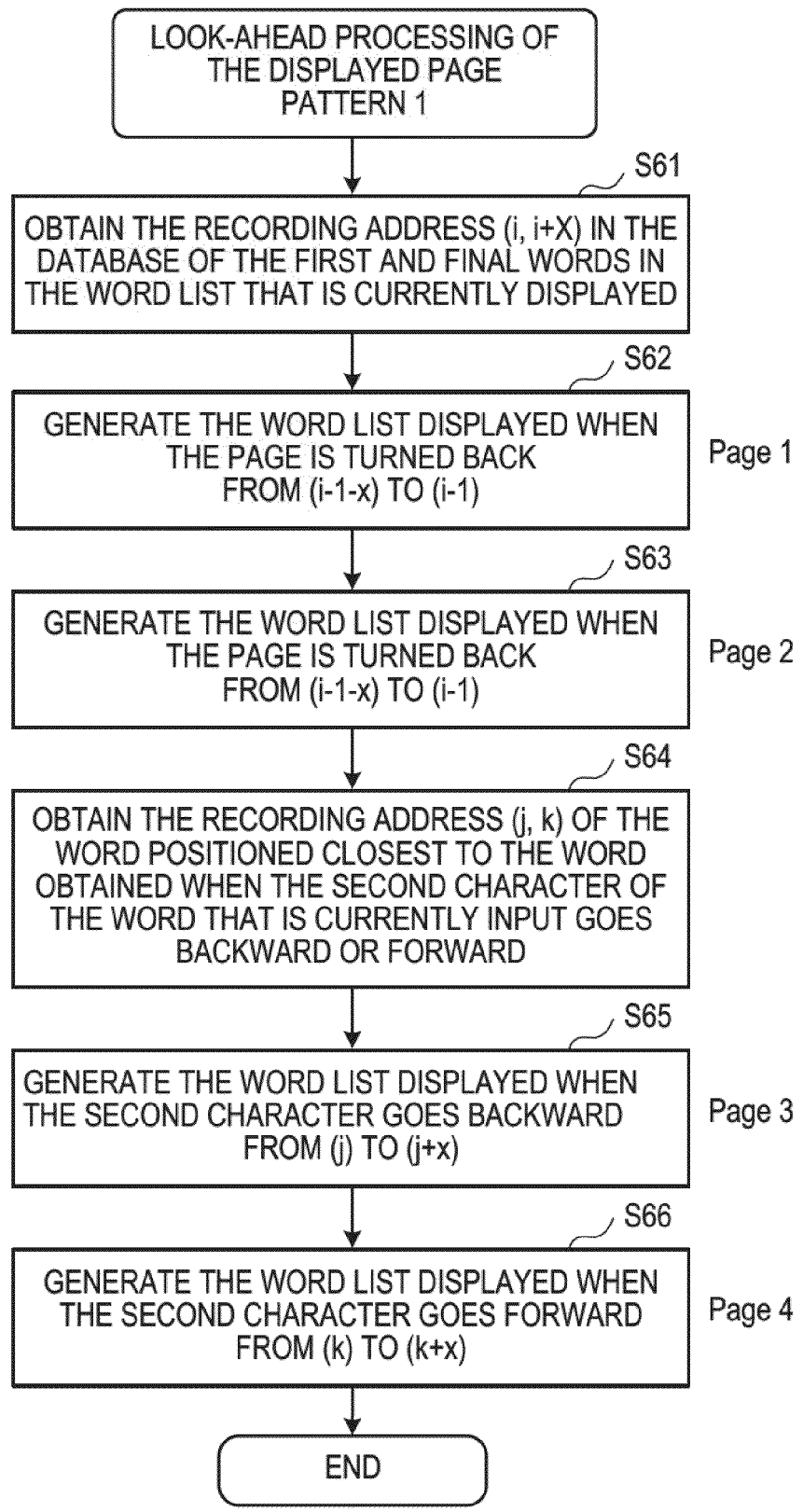
FIG. 13 is a flowchart illustrating processing procedure of a look-ahead of a displayed page.
Figure 14A:
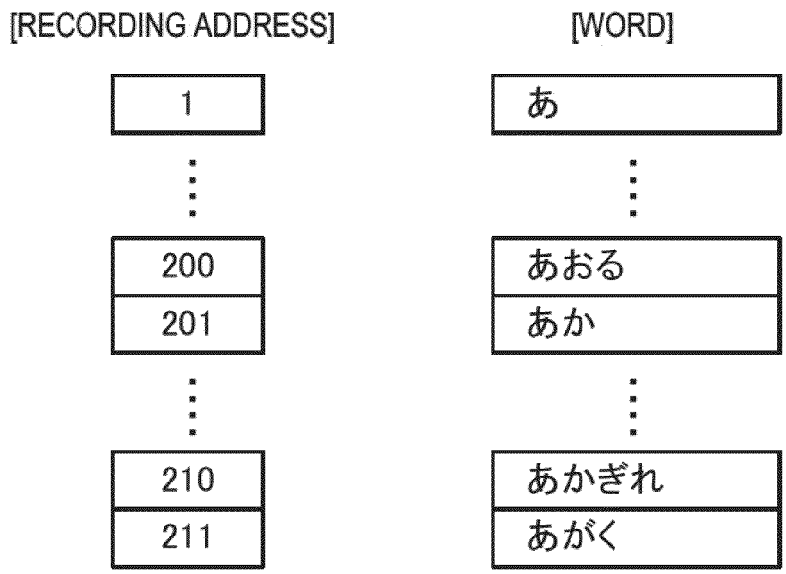
FIG. 14A to FIG. 14C are diagrams illustrating examples of contents of the processing illustrated in FIG. 13.
Figure 14B:
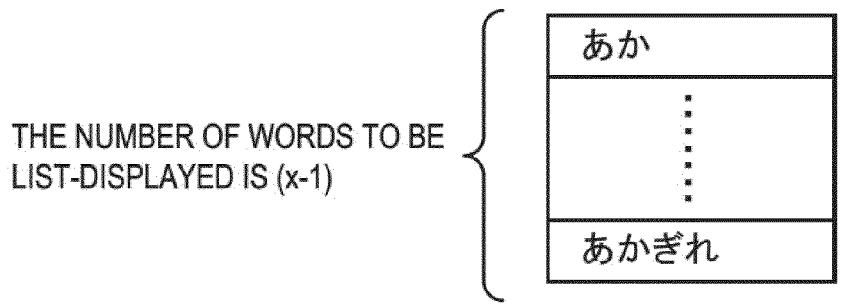
Figure 14C:
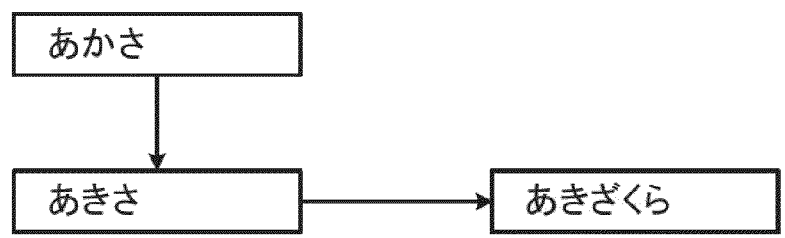
Figure 15:
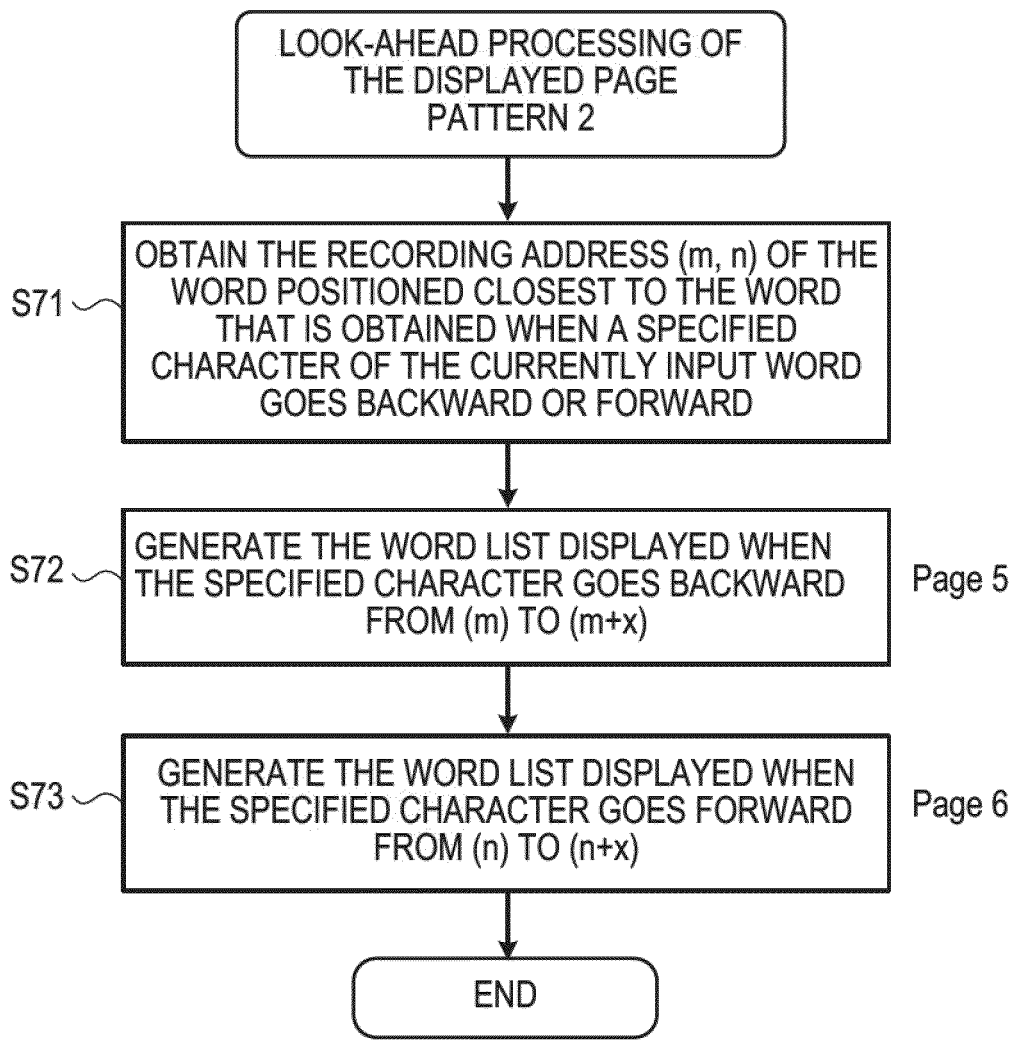
FIG. 15 is a flowchart illustrating another processing procedure of a look-ahead of a displayed page.
Figure 16:
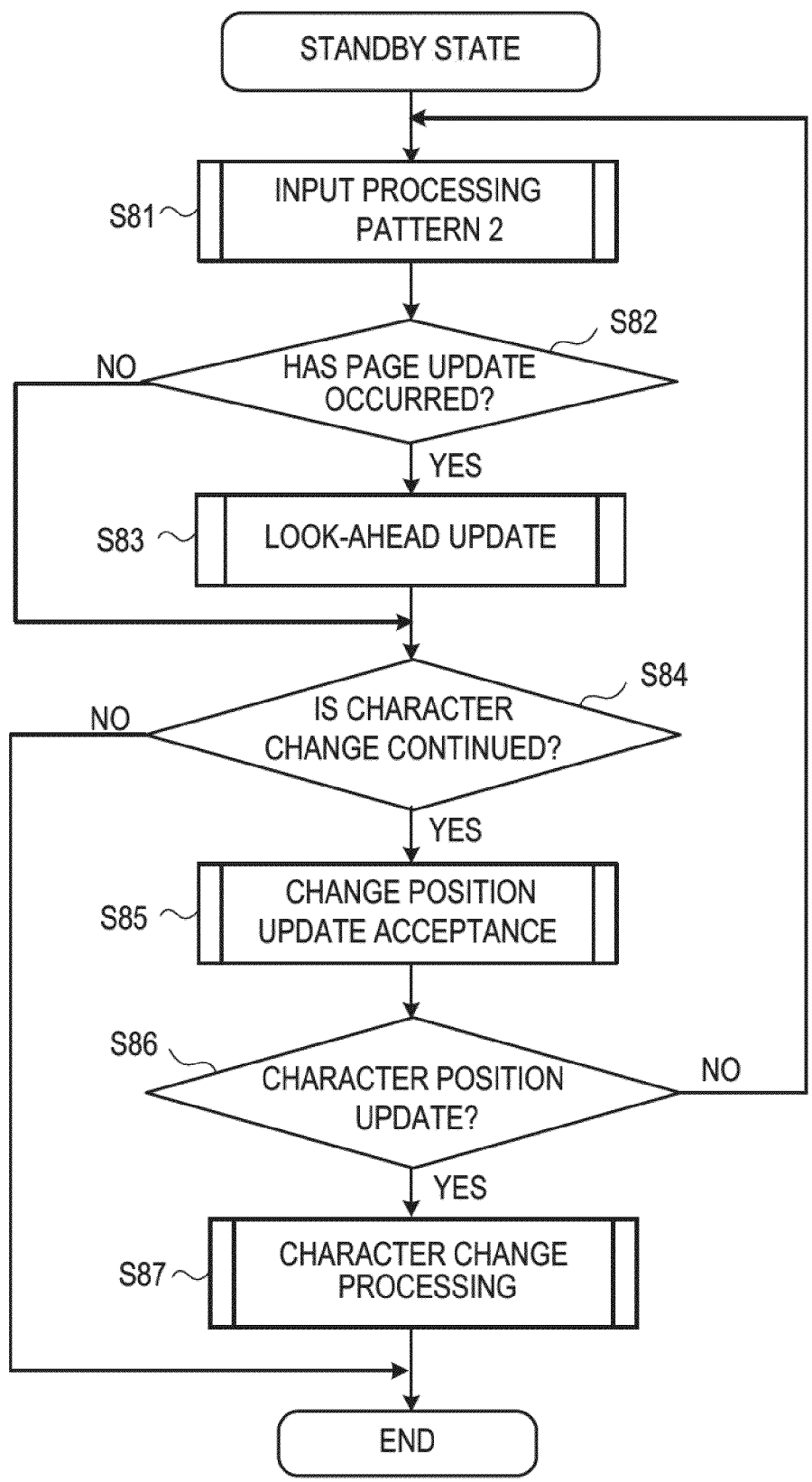
FIG. 16 is a flowchart illustrating processing procedure of a character change in a specified position.
Figure 17:
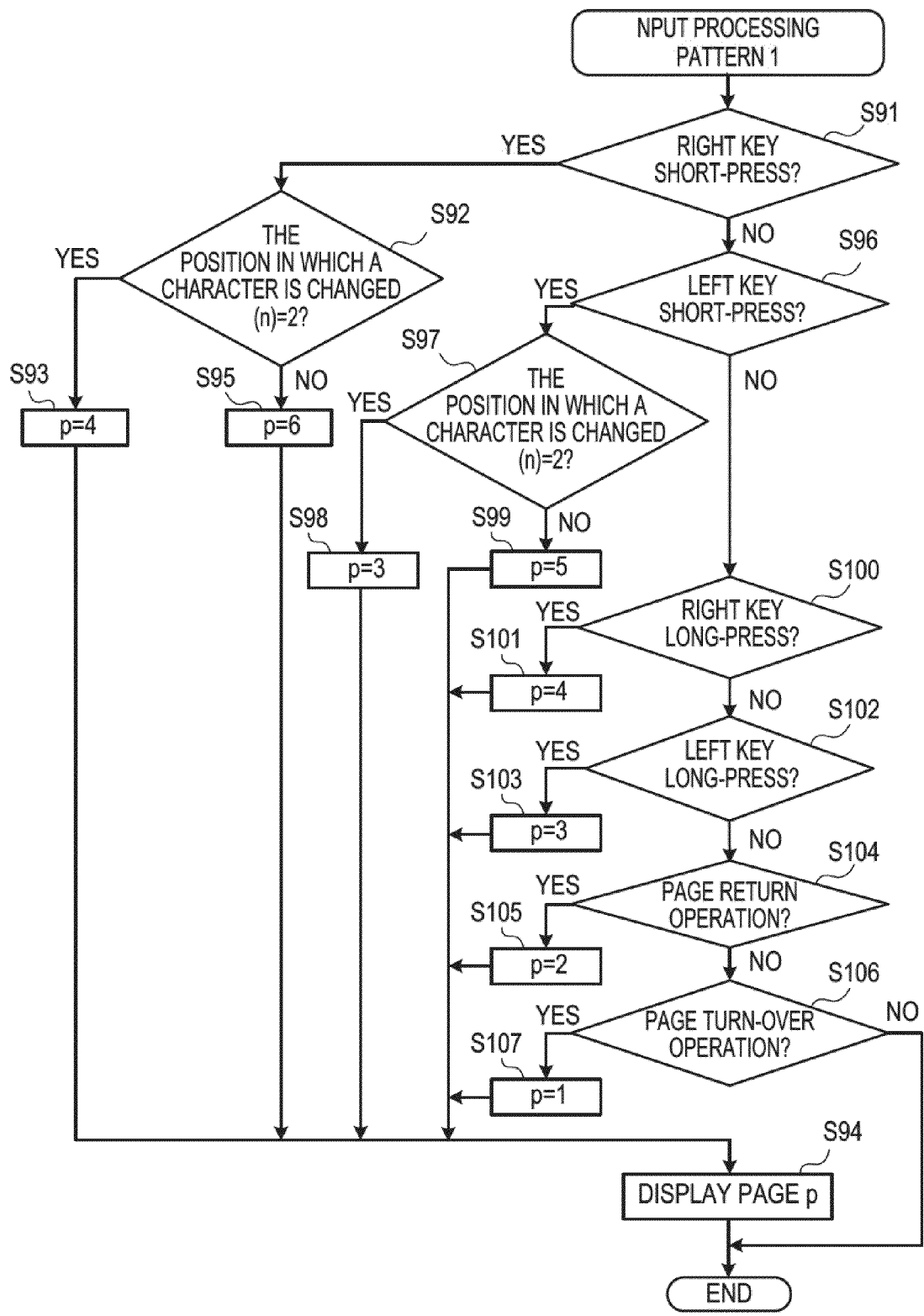
FIG. 17 is a flowchart illustrating processing procedure of an input process.
Figure 18:
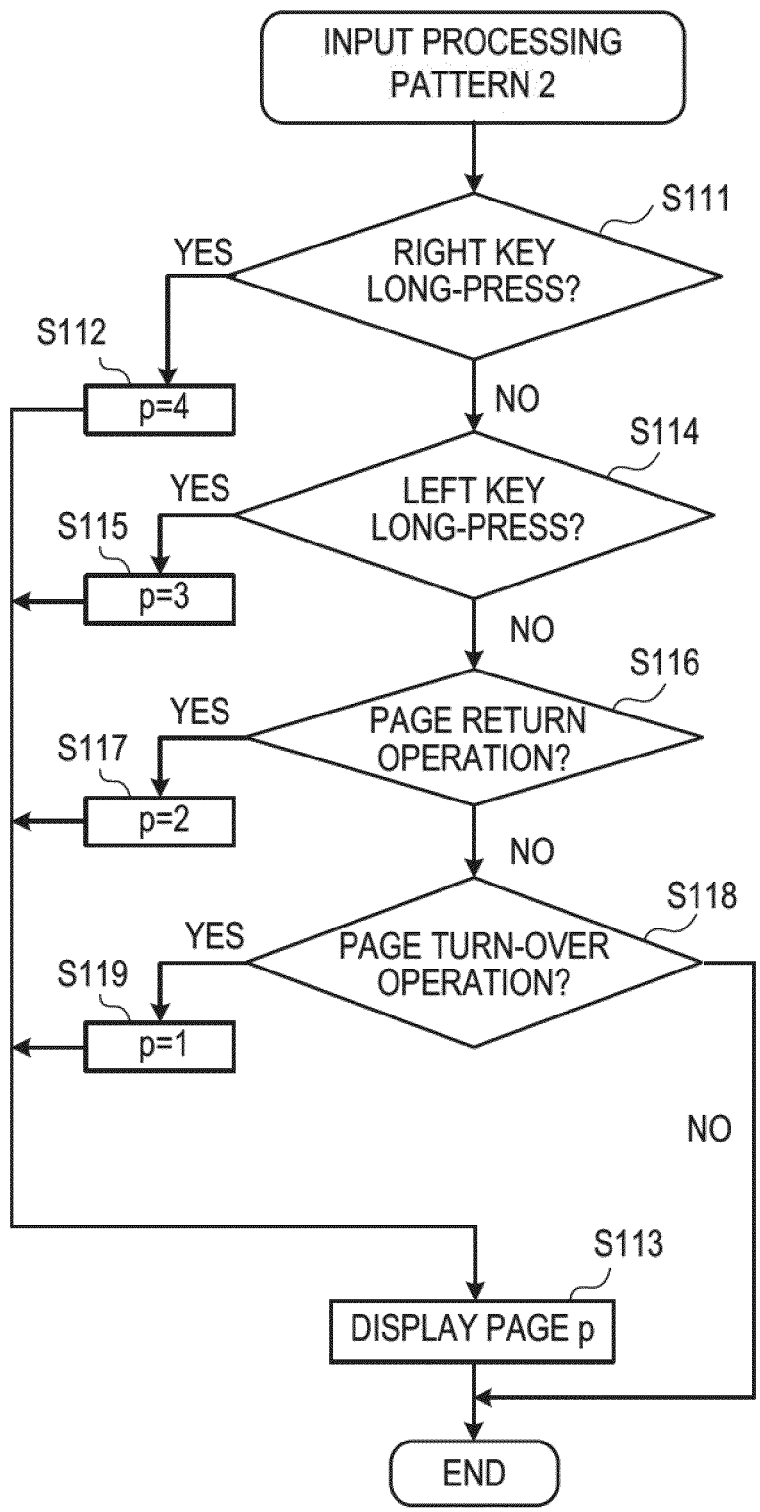
FIG. 18 is a flowchart illustrating another processing procedure of an input process.

Next, with reference to FIG. 8, FIG. 9, FIG. 10, FIG. 11, FIG. 12, FIG. 13, FIG. 14A, FIG. 14B, FIG. 14C, FIG. 15, FIG. 16, FIG. 17, and FIG. 18, description will be made of processing procedure of information retrieval. FIG. 8 is a flowchart illustrating processing procedure of operation in a standby state. FIG. 9 and FIG. 10 are flowcharts illustrating processing procedure of character change in a specified position. FIG. 11 is a flowchart illustrating processing procedure of look-ahead update. FIG. 12 is a flowchart illustrating processing procedure of change position update acceptance. FIG. 13 is a flowchart illustrating procedure for look-ahead processing (Pattern 1) of a displayed page. FIG. 14A, FIG. 14B, and FIG. 14C are diagrams illustrating an example of content of the processing illustrated in FIG. 13. FIG. 15 is a flowchart illustrating another procedure for look-ahead processing (Pattern 2) of a displayed page. FIG. 16 is a flowchart illustrating processing procedure of character change in a specified position. FIG. 17 is a flowchart illustrating processing procedure of input processing (Pattern 1). FIG. 18 is a flowchart illustrating another processing procedure of input processing (Pattern 2). The configurations of FIG. 8 to FIG. 18 are examples. The present invention is not limited to the examples. The steps in each of the flowcharts indicate processing stages and functions of a method or a program.

In a state that a word is input first, processing procedure (FIG. 8) of the standby state is performed. In this processing procedure, as illustrated in FIG. 8, after determination processing of the first input word is performed (Step S11), the look-ahead processing (Pattern 1) of the displayed page is performed (Step S12). Then the process transfers to the standby state (Step S13).

From the standby state, processing procedure (FIG. 9) of character change in the specified position is performed. In this processing procedure, as illustrated in FIG. 9, the position (n) in which a character is changed is set in the standby state (Step S21). The processing procedure determines whether or not the change position is n=2 (Step S22). If the change position is not n=2 (NO in Step S22), the look-ahead processing (Pattern 2) of the displayed page is performed (Step S23). Then the process goes to character change processing (Step S24). If the change position is n=2 (YES in Step S22), the look-ahead processing (Pattern 2) of the displayed page is not performed. Then the process goes to the character change processing (Step S24).

For the character change processing, the processing procedure (FIG. 10) of character change in the specified position is performed. In the processing procedure, as illustrated in FIG. 10, when the process goes to the character change processing, the input processing (Pattern 1) is performed (Step S31). The process determines whether or not there is an occurrence of a page update (Step S32). If the page update occurs (YES in Step S32), the look-ahead update is performed (Step S33). The process determines whether or not to continue the character change (Step S34). If there is no occurrence of the page update (NO in Step S32), the process determines whether or not to continue the character change without performing the look-ahead update (Step S34). If the character change is continued (YES in Step S34), the process goes to processing of the change position update acceptance (Step S35) and performs processes of Step S31 to Step S34. If the character change is not continued (NO in Step S34), this process is completed.

In the processing of the look-ahead update (Step S33 in FIG. 10), the processing procedure of the look-ahead update (FIG. 11) is performed. In this processing procedure, as illustrated in FIG. 11, the look-ahead processing (Pattern 1) of the displayed page is performed (Step S41). The process determines whether or not the change position (n) is set (Step S42). If the change position is set (YES in Step S42), the process determines whether or not the change position is n=2 (Step S43). If the change position n=2 is not set (NO in Step S43), the look-ahead processing (Pattern 2) of the displayed page is performed (Step S44). If the change position is not set (NO in Step S42), this process is completed without going to Step S44 even if the change position is n=2 (YES in Step S43) when the change position is set.

In the processing of the change position update acceptance (Step S35 in FIG. 10), processing procedure (FIG. 12) of the change position update acceptance is performed. As illustrated in FIG. 12, in this processing procedure, the process determines the existence of resetting of the change position (Step S51). If resetting of the change position is conducted (YES in Step S51), the present change position is stored. Specifically, the change position n is copied to the change position m (Step S52). The change position (n) in which a character is changed is updated (Step S53). The process determines whether or not the change position is n=m (Step S54). If the change position is not n=m (NO in Step S54), the process determines whether or not the change position is m=2 (Step S55). If the change position is not m=2 (NO in Step S55), the data obtained by Pattern 2 of the look-ahead processing of the displayed page is discarded (Step S56). Then the process determines whether or not the change position is n=2 (Step S57).

If the change position is m=2 (YES in Step S55), the process determines whether or not the change position is n=2 without going to Step S56 (Step S57).

If the change position is not n=2 (NO in Step S57), the look-ahead processing (Pattern 2) of the displayed page is performed (Step S58). Then the process is ended.

In this processing procedure, this process is also ended if resetting of the character position is not performed (NO in Step S51), if the change position is n=m (YES in Step S54), or if the change position is n=2 (YES in Step S57).

In the look-ahead processing (Pattern 1) of the displayed page (Step S41 in FIG. 11), processing procedure (FIG. 13) of the look-ahead processing (Pattern 1) of the displayed page is performed. In this processing procedure, as illustrated in FIG. 13, a recording address (i, i+x) in a database of the first word and the final word of the word list that is currently displayed is obtained (Step S61). After this address is obtained, the word list, which is to be displayed when the page is returned, is generated. The word list from (i−1−x) to (i−1) is generated (Step S62). The page with this word list is "Page 1."

The word list, which is to be displayed when the page is turned over, is generated. Specifically, the word list from (i+1) to (i+1+x) is generated (Step S63). The page with this word list is "Page 2."

After the above-described word list is generated, a recording address (j, k) of a word positioned closest to the word, which is obtained when the second character of the already-input word goes backward or when the second character goes forward, is obtained (Step S64).

After this recording address is obtained, a word list, which is displayed when the second character goes backward, is generated. Specifically, the word list from (j) to (j+x) is generated (Step S65). The page with this word list is "Page 3."

The word list, which is displayed when the second character goes forward, is generated. Specifically, the word list from (k) to (k+x) is generated (Step S66). The page with this word list is "Page 4."

As illustrated in FIG. 14A, the relationship between the recording address and the word in this processing procedure indicates that the recording address "1" corresponds to the word starting with "あ" and a recording address "200" corresponds to the word "あおる." A recording address "201" corresponds to the word starting with "あか." The recording address "210" corresponds to the word "あかぎれ." A recording address "211" corresponds to the word "あがく."

As illustrated in FIG. 14B, the number of words displayed in the list is (x−1), and the list displays the words from "あか" to "あかぎれ."

As for the word "あかさ," if the second character goes forward, the word "あきさ" may be obtained as illustrated in FIG. 14C. At this time, the word located closest to the word "あきさ" is the word "あきざくら."

For the look-ahead processing (Pattern 2) of the displayed page (Step S23 in FIG. 9, Step S44 in FIG. 11, and Step S58 in FIG. 12), processing procedure (FIG. 15) of the look-ahead processing (Pattern 2) of the displayed page is performed. In this processing procedure, as illustrated in FIG. 15, a recording address (m, n) of the word positioned closest to the word, which is obtained when a specified character of the currently input word goes backward or forward, is obtained (Step S71). After this address is obtained, the word list, which is to be displayed when the specified character goes backward, is obtained (Step S72). In this word list, from (m) to (m+x) are generated, and the page with the list is "Page 5". The word list, which is displayed when the specific character goes forward, is generated (Step S73). In this word list, from (n) to (n+x) are generated, the page with the list is "Page 6". Then the process is completed.

In the standby state of second character change processing, processing procedure (FIG. 16) of the standby state is performed. This processing procedure performs the input processing (Pattern 2) (Step S81) and determines whether or not page update has occurred (Step S82). If the page update has occurred (YES in Step S82), the look-ahead update is performed (Step S83). The process determines whether or not to continue the character change (Step S84). If the page update has not occurred (NO in Step S82), the process determines whether or not to continue the character change without performing the look-ahead update (Step S84).

If the character change is continued (YES in Step S84), the change position update acceptance is performed (Step S85), and the process determines whether or not to perform the update of the character position (Step S86). If the update of the character change is performed (YES in Step S86), character change processing is performed (Step S87). Then the process is completed. In this character change processing, when the position in which a character is changed is set, the process goes to the above-described character change processing.

If the character change is not continued (NO in Step S84), the process is completed without performing the change position update acceptance (Step S85), without performing determination whether or not to perform the update of the character position (Step S86), or without performing the character change processing (Step S87).

After the change position update acceptance, if the update of the character position is not performed (NO in Step S86), the process goes back to Step S81. Then the same process is continued.

In the input processing (Pattern 1) when the change position of the character is specified, the input processing (Pattern 1 in FIG. 17) is performed. In this processing, a specification function of the change position of the character is allocated to short depression of the left key 326 or the right key 328 and to long depression of the left key 326 or the right key 328.

In this processing procedure, as illustrated in FIG. 17, the process determines the presence of a short press of the right key 328 (Step S91). If the right key 328 is short-pressed (YES in Step S91), the process determines whether or not the position in which the character is changed is (n)=2 (Step S92). If the position in which the character is changed is n=2 (YES in Step S92), the page is p=4 (Step S93). The page p is displayed (Step S94) and, the process is completed. If the position in which the character is changed is not n=2 (NO in Step S92), the page is p=6 (Step S95). The page p is displayed (Step S94), and the process is ended.

If the right key 328 is not short-pressed (NO in Step S91), the process determines the presence of short pressing of the left key 326 (Step S96). If the left key 326 is short-pressed (YES in Step S96), the process determines whether or not the position in which the character is changed is (n)=2 (Step S97). If the position in which the character is changed is n=2 (YES in Step S97), the page is p=3 (Step S98). The page p is displayed (Step S94), and the process is completed. If the position in which the character is changed is not n=2 (NO in Step S97), the page is p=5 (Step S99). The page p is displayed (Step S94), and the process is ended.

If the left key 326 is not short-pressed (NO in Step S96), the process determines the presence of a long key press of the right key 328 (Step S100). If the right key 328 is long-pressed (YES in Step S100), the page is P=4 (Step S101). The page p is displayed (Step S94), and the process is completed. If the right key 328 is not long-pressed (NO in Step S100), the process determines the presence of a long key press of the left key 326 (Step S102). If the left key 326 is long-pressed (YES in Step S102), the page is p=3. The page p is displayed (Step S94), and the process is completed.

If the left key 326 is not long-pressed (NO in Step S102), the process determines whether or not a page return operation is performed (Step S104). If the page return operation is performed (YES in Step S104), the page is p=2 (Step S105). The page p is displayed (Step S94), and the process is completed.

If the page return operation is not performed (NO in Step S104), the process determines whether or not a page turn-over operation is performed (Step S106). If the page turn-over operation is performed (YES in Step S106), the page is p=1 (Step S10). The page p is displayed (Step S94), and the process is completed. If the page turn-over operation is not performed (NO in Step S106), the process is ended without displaying the page p.

In the input processing (Pattern 2) when the change position of the character is not specified, the input processing (Pattern 2) (FIG. 18) is performed. In this processing, the specification function of the change position of the character is allocated to the long key press of the right key 326 or the right key 328.

In this processing procedure, as illustrated in FIG. 18, the process determines the presence of a long key press of the right key 328 (Step S111). If the right key 328 is long-pressed (YES in Step S111), the page is p=4 (Step S112). The page p is displayed (Step S113), and the process is completed.

The right key 328 is not long-pressed (NO in Step S111), the process determines the presence of a long key press of the left key 326 (Step S114). If the left key 326 is long-pressed (YES in Step S114), the page is p=3. The page p is displayed (Step S113), and the process is completed.

If the left key 326 is not long-pressed (NO in Step S114), the process determines whether or not the page return operation is performed (Step S116). If the page return operation is performed (YES in Step S116), the page is p=2 (Step S117). The page p is displayed (Step S113), and the process is completed.

If the page return operation is not performed (NO in Step S116), the process determines whether or not the page turn-over operation is performed (Step S118). If the page turn-over operation is performed (YES in Step S118), the page is p=1 (Step S119). The page p is displayed (Step S113), and the process is completed. If the page turn-over operation is not performed (NO in Step S118), the page p is not displayed, and the process is completed.

Next, with reference to FIG. 19 and FIG. 20, description will be made of a character change in a word. FIG. 19A to FIG. 19G and FIG. 20A to FIG. 20G are diagrams illustrating a character change in a word. The configurations illustrated in FIG. 19A to FIG. 19G and FIG. 20A to FIG. 20G are examples. The present invention is not limited to the examples. In FIG. 19A to FIG. 19G and FIG. 20A to FIG. 20G, the same parts as in FIG. 1, FIG. 5A, and FIG. 5B are indicated with the same numerals.

(1) A case where a position of a character to be changed is not set (FIG. 19a to FIG. 19g)

As illustrated in FIG. 19A, if the word "あかさ" is input into the input column 41, the list display column 48 displays the following words corresponding to the word "あかさ":

あかざ (AKAZA) (wild spinach) [藜]
あかし (AKASHI) (proof) [証し]
あかし (AKAJI) (deficit) [赤字]
アカシア (AKASHIA) (acacia) [アカシア]
あかしお (AKASHIO) (red tide) [赤潮]

The word meaning column 50 in the lower side of the list display column 48 displays "an annual plant of the family Chenopodiaceae" as the meaning of the word "あかざ" in the position of the cursor.

If the up key 322 is short-pressed in the state of the screen display of FIG. 19A, as illustrated in FIG. 19B, the state is changed into a state in which one word goes backward. The list display column 48 displays words as follows:

あがき (AGAKI) (struggle) [足掻]
あかぎれ (AKAGIRE) (kibe) [皸・皹]
あがく (AGAKU) (to struggle) [足掻く]
あかげ (AKAGE) (red hair) [赤毛]
あかご (AKAGO) (baby) [赤子・赤児]

The word meaning column 50 in the lower side of the list display column 48 displays "a baby, an infant" and the like as the meaning of the word "あかご" in the position of the cursor.

If the down key 324 is short-pressed in the state of the screen display of FIG. 19A, as illustrated in FIG. 19C, the state is changed into a state in which one word goes forward. The list display column 48 displays words as follows:

あかざ (AKAZA) (wild spinach) [藜]
あかし (AKASHI) (proof) [証し]
あかじ (AKAJI) (deficit) [赤字]
アカシア (AKASHIA) (acacia) [アカシア]
あかしお (AKASHIO) (red tide) [赤潮]

The word meaning column 50 displays "information, documents, etc. that show something is true" and the like as the meaning of the word "あかし" in the position of the cursor.

If the left key 326 is short-pressed in the state of the display of FIG. 19A, the page is changed into the previous page as illustrated in FIG. 19D, and the list display column 48 displays words as follows:

あがき (AGAKI) (struggle) [足掻]
あかぎれ (AKAGIRE) (kibe) [皸・皹]
あがく (AGAKU) (to struggle) [足掻く]

あかげ (AKAGE) (red hair) [赤毛]
あかご (AKAGO) (baby) [赤子・赤児]

The word meaning column 50 in the lower side of the list display column 48 displays "to struggle" as the meaning of the word "あがき" in the position of the cursor.

If the left key 326 is long-pressed or if the left soft key 344 is short-pressed in the state of the screen display of FIG. 19A, the page is changed into the previous page as illustrated in FIG. 19E. The list display column 48 displays words as follows:

あおさ (AOSA) (layer) [石蓴]
あおざめる (AOZAMERU) (to pale) [蒼(青)褪める]
あおじゃしん (AOJASHIN) (blueprint) [青写真]
あおじろい (AOJIROI) (pale) [青白い・蒼白い]
あおすじ (AOSUJI) (blue vein) [青筋・青条]

The word meaning column 50 in the lower side of the list display column 48 displays "a generic name of seaweed of the family Ulvaceae of the green algae" as the meaning of the word "あかさ" in the position of the cursor. This display indicates the state where the second character goes backward to the next character in the Japanese syllabary.

If the right key 328 is short-pressed in the state of the screen display of FIG. 19A, the page is changed into the next page as illustrated in FIG. 19F. The list display column 48 displays words as follows:

あかじみる (AKAJIMIRU) (grimy) [垢染みる]
あかす (AKASU) (to prove) [証す]
あかす (AKASU) (to reveal) [明かす]
あかす (AKASU) (to make weary) [飽かす]
あかず (AKAZU) (unsatisfied) [飽かず・厭かず]

The word meaning column 50 in the lower side of the list display column 48 displays "to make something grimy" as the meaning of the word "あか じみる" in the position of the cursor.

If the right key 328 is long-pressed or if the right-down soft key 348 is short-pressed in the state of the screen display of FIG. 19A, the page is changed into the next page as illustrated in FIG. 19G. The list display column 48 displays words as follows:

あきざくら (AKIZAKURA) (cosmos) [秋桜]
あきさむ (AKISAMU) (autumn coldness) [秋寒]
あきさめ (AKISAME) (autumn rain) [秋雨]
あきす (AKISU) (thief) [空き巣]
あきたりない (AKITARINAI) (dissatisfied) [飽き足りない]

The word meaning column 50 in the lower side of the list display column 48 displays "another name for cosmos" as the meaning of the word "あ きざくら" in the position of the cursor. This display indicates that the second character goes forward to the next character in the Japanese syllabary.

(2) A case where a character position to be changed is set (FIG. 20A to FIG. A20G)

After a word is input, the character key 30 of "3" is pressed, and the position 53 of the third character in the input word is specified to be changed.

As illustrated in FIG. 20A, if the word "あかさ" is input into the input column 41, the list display column 48 displays the following words corresponding to the word "あかさ":

あかざ (AKAZA) (wild spinach) [藜]
あかし (AKASHI) (proof) [証し]
あかじ (AKAJI) (deficit) [赤字]
アカシア (AKASHIA) (acacia) [アカシア]
あかしお (AKASHIO) (red tide) [赤潮]

The word meaning column 50 in the lower side of the list display column 48 displays "an annual plant of the family Chenopodiaceae" as the meaning of the word "あかざ" the position of the cursor.

If the up key 322 is short-pressed in the state of the screen display of FIG. 20A, the state is changed into a state in which one word goes backward as illustrated in FIG. 20B. The list display column 48 displays words as follows:

あがき (AGAKI) (struggle) [足掻]
あかぎれ (AKAGIRE) (kibe) [皸・皹]
あがく (AGAKU) (to struggle) [足掻く]
あかげ (AKAGE) (red hair) [赤毛]
あかご (AKAGO) (baby) [赤子・赤児]

The word meaning column 50 in the lower side of the list display column 48 displays "a baby, an infant" and the like as the meaning of the word "あかご" in the position of the cursor.

If the down key 324 is short-pressed in the state of the screen display of FIG. 20A, the state is changed into a state in which one word goes forward as illustrated in FIG. 20C. The list display column 48 displays words as follows:

あかざ (AKAZA) (wild spinach) [藜]
あかし (AKASHI) (proof) [証し]
あかじ (AKAJI) (deficit) [赤字]
アカシア (AKASHIA) (acacia) [アカシア]
あかしお (AKASHIO) (red tide) [赤潮]

The word meaning column 50 in the lower side of the list display column 48 displays "information, documents, etc. that show something is true" and the like as the meaning of the word "あかし" in the position of the cursor. The state changing from FIG. 20A to FIG. 20B or FIG. 20C is the same as the state where the character to be changed is not specified.

If the left key 326 is short-pressed in the screen display state of FIG. 20A. As illustrated in FIG. 20D, the word "あかさ" in the input column 41 is changed into the word "あかこ" after the third character is changed. The list display column 48 displays words as follows:

あかご (AKAGO) (baby) [赤子・赤児]
あかざ (AKAZA) (wild spinach) [藜]
あかし (AKASHI) (proof) [証し]
あかじ (AKAJI) (deficit) [赤字]
アカシア (AKASHIA) (acacia) [アカシア]

The word meaning column 50 in the lower side of the list display column 48 displays "a baby, an infant" and the like as the meaning of the word "あかご" in the position of the cursor.

If the left key 326 is long-pressed or if the left-down soft key 344 is short-pressed in the screen display state of FIG. 20A, the word "あかさ" is changed into the word "あおさ" after the second character in the input column 41 is changed as illustrated in FIG. 20E. The list display column 48 displays words as follows:

あおさ (AOSA) (layer) [石蓴]
あおざめる (AOZAMERU) (to turn pale) [蒼(青)褪める]
あおじゃしん (AOJASHIN) (blueprint) [青写真]
あおじろい (AOJIROI) (pale) [青白い・蒼白い]
あおすじ (AOSUJI) (blue vein) [青筋・青条]

The word meaning column 50 in the lower side of the list display column 48 displays "a generic name of seaweed of the family Ulvaceae of the green algae" as the meaning of the word "あおさ" in the position of the cursor. This display indicates the state where the second character goes backward to the next character in the Japanese syllabary.

If the right key 328 is short-pressed in the screen display state of FIG. 20A, the third character goes forward in the Japanese syllabary as illustrated in FIG. 20F. The word "あかさ" the input column 41 is changed into the word "あかし". The list display column 48 displays words as follows:

あかし (AKASHI) (proof) [証し]
あかじ (AKAJI) (deficit) [赤字]
アカシア (AKASHIA) (acacia) [アカシア]
あかじみる (AKAJIMIRU) (grimy) [垢染みる]

The word meaning column 50 in the lower side of the list display column 48 displays "information, documents, etc. that show something is true" as the meaning of the word "あかし" in the position of the cursor.

If the right key 328 is long-pressed or the right-down soft key 348 is short-pressed in the screen display state of FIG. 20A, the second character goes forward in the Japanese syllabary as illustrated in FIG. 20G. The word "あかさ" in the input column is changed into the word "あきさ." The list display column 48 displays words as follows:

あきざくら (AKIZAKURA) (cosmos) [秋桜]
あきさむ (AKISAMU) (autumn coldness) [秋寒]
あきさめ (AKISAME) (AUTUMN RAIN) [秋雨]
あきす (AKISU) (thief) [空き巣]
あきたりない (AKITARINAI) (dissatisfied) [飽き足りない]

The word meaning column 50 in the lower side of the list display column 48 displays "another name for cosmos" as the meaning of the word "あきざくら" in the position of the cursor.

Next, feature items extracted from the above-described embodiment and advantages of the feature items, modification examples recalled from the above-described embodiment, and the like will be listed below.

(1) The above-described embodiment focuses on the fact that, if one character goes backward or forward, the second character in the position where the distance between the word before the change and the word after the change is longest. That is, the above-described embodiment focuses on the fact that the number of words between the word before the change and the word after the change is the largest.

As for the input word in the Japanese syllabary (or alphabetical order), the word where the distance between the words seems to be short may have the same first character and different second or following characters. If the first character is different, the distance between the words does not seem to be short, and a character may be re-input. By a user interface (UI) such as a tab or the like of a keyboard, the first character is easily changed in a conventional mobile device. However, the character is unable to be changed in the position of the second or following character.

Figures 25A, 25B:
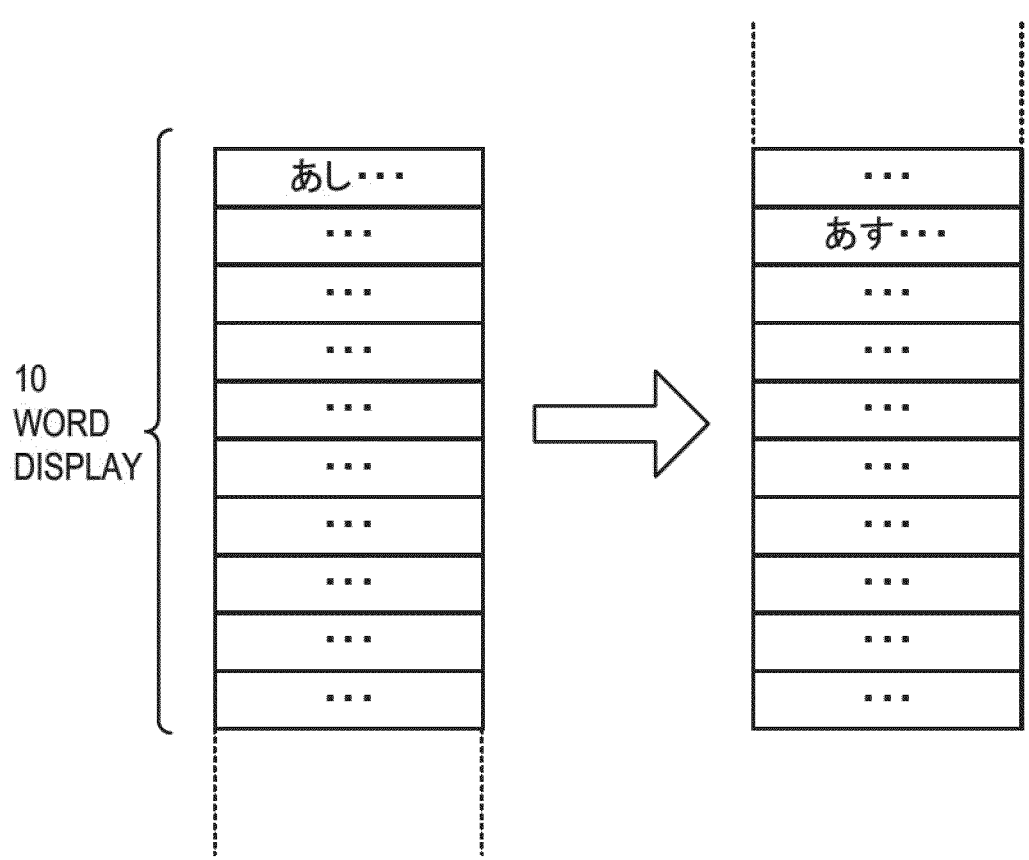
FIG. 25A and FIG. 25B are diagrams illustrating a conventional selection operation of a character string.
Figure 26:
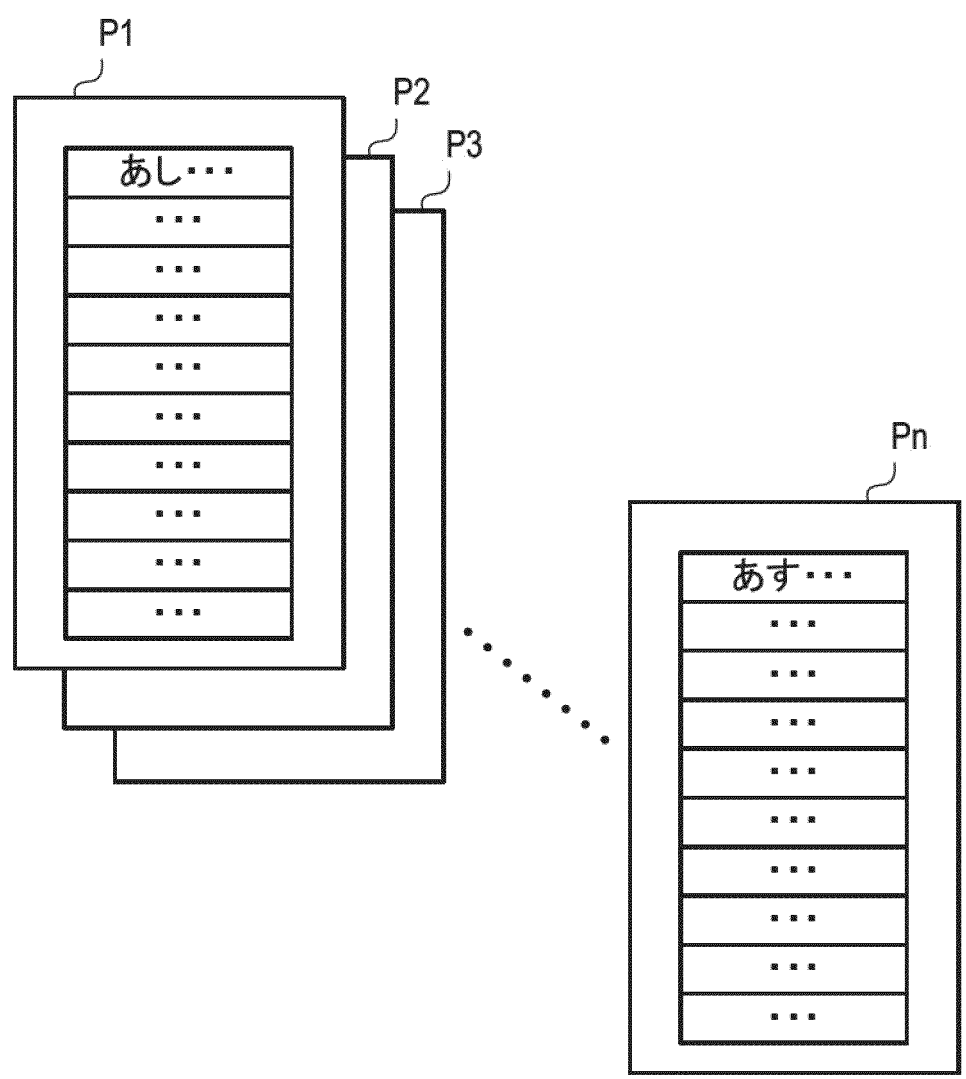
FIG. 26 is a diagram illustrating another selection operation of a character string by a conventional page change.

The above-described embodiment focuses on the second character as a change position. This is because the operations for turning pages and selecting pages are most frequently performed when the operations are repeated until the second character is changed. Therefore, the second character may be the position in which the number of the operations is reduced the most. The conventional techniques (FIG. 25 and FIG. 26) may require five hundred operations or fifty page changes. However, in the above-described embodiment, a simple key operation, that is, one operation of a long-key press of the left key 326 or the right key 328 and pressing of the left-down soft key 344 or the right-down soft key 348 achieves the character change of the second character. However, the present invention is not limited to the second character.

(2) Although the number of words between two words seems to be small to users, the number of the words may actually be large. For character input and character retrieval, troublesome character input or enormous word selection operations are required to be performed. According to the above-described embodiment, the number of the operations may be reduced, so that a user may get relief from stress caused by the character input and the changes. In addition, the time required for retrieval may be shortened, and the retrieval may be continued for a symbol string such as a desired word or a character string without performing the character input. The number of types of candidates in a list to be displayed is just six. Thus, all of the candidates may be cached. Moreover, the speed of the list display or the change may be increased.

(3) As for the number of the operations required for the character input and the character retrieval, if a character goes backward or forward in the Japanese syllabary (or alphabetical order) in a conventional technique, the final character may be re-input with the character to be displayed first when a numeric key is pressed (press "2" one time for "a", and press "3" one time for "d") if the number of operations is small. The number of the operations is the smallest when alphabet input is performed. Depending on a mobile device, input may be determined without pressing the determination key. In the above-described embodiment, when the number of the operations is small and the dictionary is used when the word has a two-digit length, the number of position specification operations is increased by one operation, and the total number of the operations is three. However, the number of the key operations is smaller than in the conventional technique. In a comparison example, for example, when the user re-inputs hiragana "こ," five operations to select "こ," and an operation for input determination are added. Thus, the number of the operations is increased by five operations compared to the smallest number of the operations. However, in the present invention, the number of the operations remains two.

With reference to FIG. 21A to FIG. 21E and FIG. 22, key operation of character retrieval will be described. FIG. 21A to FIG. 21E are diagrams illustrating character change and word group change of the comparison example. FIG. 22 is a diagram illustrating operation number comparison.

In the comparison example, as illustrated in FIG. 21A, if the word "あかさ" is input into the input column 41, the list display column 48 displays the following words corresponding to the word "あかさ";

あかざ (AKAZA) (wild spinach) [藜]
あかし (AKASHI) (proof) [証し]
あかじ (AKAJI) (deficit) [赤字]
アカシア (AKASHIA) (acacia) [アカシア]
あかしお (AKASHIO) (red tide) [赤潮]

The word meaning column 50 in the lower side of the list display column 48 displays "an annual plant of the family Chenopodiaceae" as the meaning of the word "あかざ" the position of the cursor.

If the up key 322 is short-pressed in the screen display state of FIG. 21A, the display indicates the state in which one word goes back. The list display column 48 displays words as follows:

あがき (AGAKI) (struggle) [足掻]
あかぎれ (AKAGIRE) (kibe) [皸・皹]
あがく (AGAKU) (to struggle) [足掻く]
あかげ (AKAGE) (red hair) [赤毛]
あかご (AKAGO) (baby) [赤子・赤児]

The word meaning column 50 in the lower side of the list display column 48 displays "a baby, an infant" and the like as the meaning of the word "あかご" in the position of the cursor.

If the down key 324 is short-pressed in the screen display state of FIG. 21A, the display indicates the state in which one word goes forward. The list display column 48 displays words as follows:

あかざ (AKAZA) (wild spinach) [藜]
あかし (AKASHI) (proof) [証し]
あかじ (AKAJI) (deficit) [赤字]
アカシア (AKASHIA) (acacia) [アカシア]

あかしお (AKASHIO) (red tide) [赤潮]

The word meaning column 50 in the lower side of the list display column 48 displays the meaning of the word "あかし" in the position of the cursor.

If the left key 326 is short-pressed in the screen display state of FIG. 21A, the page is changed to the previous page as illustrated in FIG. 21D. The list display column 48 displays words as follows:

あがき (AGAKI) (struggle) [足掻]
あかぎれ (AKAGIRE) (kibe) [皹・皸]
あがく (AGAKU) (to struggle) [足掻く]
足掻く (AKAGE) (red hair) [赤毛]
あかご (AKAGO) (baby) [赤子・赤児]

The word meaning column 50 in the lower side of the list display column 48 displays "struggle" as the meaning of the word "あがき" in the position of the cursor.

If the right key 328 is short-pressed in the screen display state of FIG. 21A, the page is changed into the next page as illustrated in FIG. 21E. The list display column 48 displays words as follows:

あかじみる (AKAJIMIRU) (grimy) [垢染みる]
あかす (AKASU) (to prove) [証す]
あかす (AKASU) (to reveal) [明かす]
あかす (AKASU) (to make weary) [飽かす]
あかず (AKAZU) (dissatisfied) [飽かず・厭かず]

The meaning column in the lower side of the list display column 48 displays "make something grimy" as the meaning of the word "あかじみる" in the position of the cursor.

As described above, in the comparison example, only the character change in the word in accordance with the arrangement order of the Japanese syllabary is obtained. After the word is input, a great number of key operations are required to reach a desired word. If the user recognizes that he/she may not reach the desired word, the user newly inputs a word. As a result, the number of the key operations is increased.

Therefore, as illustrated in FIG. 22, the comparison example has the following four operations:

a) Prepare a state in which a character may be input.
b) Delete the final character.
c) Press a key one time to input a letter.
d) Determine an input word by a determination key and go back to the list.

In the present embodiment, the operations for the character input and the character change are performed as follows:

A) Specify a position of a character to be changed by pressing a numeric key.
B) Make the character go backward or forward in the Japanese syllabary by the right key or the left key.

The number of the operations is two. The number of the operations is reduced compared to the comparison example.

When a word is re-input in the mobile device in which the first character is focused on, the number of the operations is increased by one to focus on the second character. Since the first focus position is changeable in the setting, a case where this focus move operation is excluded is described as the smallest number of the operations.

(4) For the word that is already input into the text box, a character position setting operation may specify the character position, or make the specified character go backward or forward in the Japanese syllabary (or alphabetical order) by the character backward and forward operation. For example, the second character of the specified character may go forward to "あき..." from "あか..." and the second character of the specified character may go backward to "あお..." from "あか...."

(5) Particularly, the second character in a word may go backward or forward in the Japanese syllabary by operations different from the character backward and forward operation without performing the above-described character position setting operation.

(6) The above-described operation may be performed by an easy operation (direction key pressing and the like), not by the character input.

(7) The data of the candidates displayed by the character backward and forward operation is cached into the data temporary storage unit 606, so that the speed of update of the display is increased.

Other Embodiments (1) As for a symbol string, the first embodiment illustrates words and character strings. Pictographic characters, symbols, figures, and the like may also be used.

(2) As for arrangement, the first embodiment illustrates the alphabetical order in addition to the Japanese syllabary. Other arrangement orders may also be used.

(3) In the above-described embodiment, the mobile device 2 is illustrated as an information retrieval apparatus. An electronic dictionary, which is mounted with the above-described mobile device and the information retrieval method or the information retrieval program, may also be used.

(4) In the above-described embodiment, the mobile device 2 is illustrated as an information retrieval apparatus. An electronic address book, which is mounted with the above-described information retrieval apparatus and the information retrieval method or the information retrieval program, may also be used.

(5) The above-described information retrieval apparatus, the information retrieval method, or the information retrieval program may be used for word retrieval in web pages or text documents.

(6) The above-described embodiment illustrates the mobile device 2 and the electronic dictionary. Electric apparatuses such as a personal digital assistant (PDA) 80 (FIG. 23), a personal computer (PC) 90 (FIG. 24) may also be used.

Figure 23:
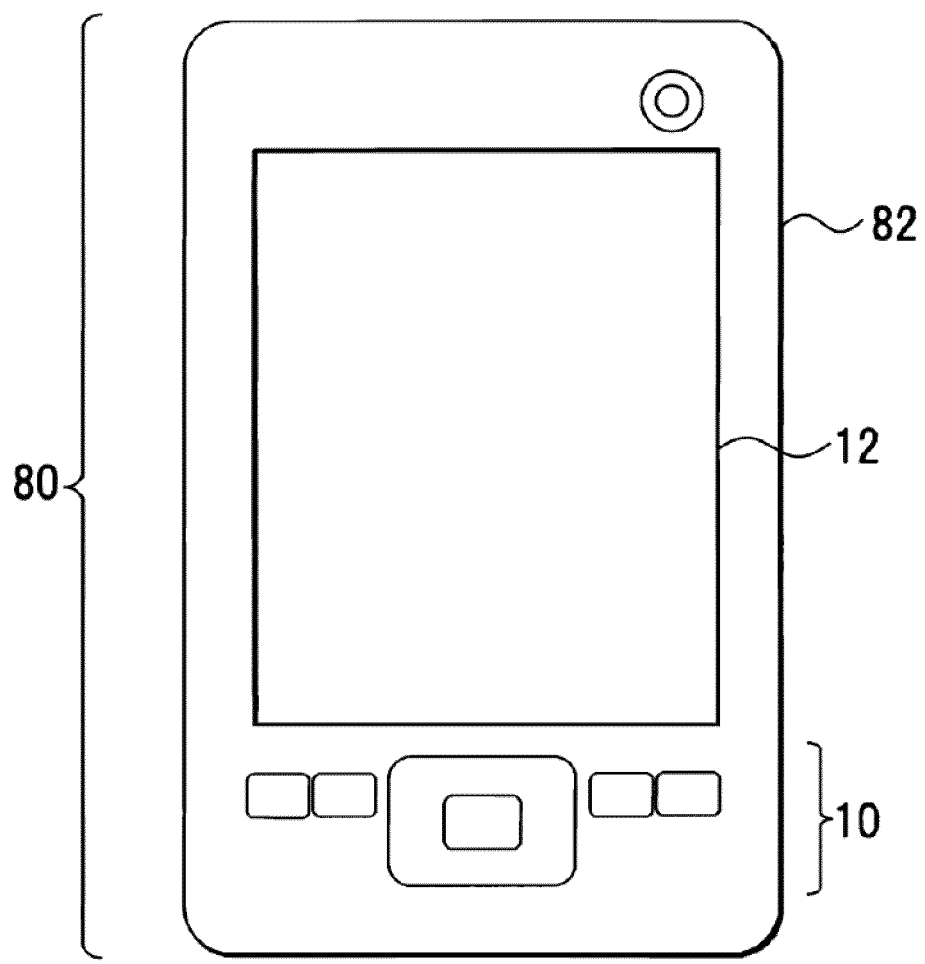
FIG. 23 is a diagram illustrating a PDA according to another embodiment.

The PDA 80 is an example of an electronic apparatus. As illustrated in FIG. 23, the housing unit 82 includes an operation input unit 10, a display unit 12, and the like, and includes functional units indicated in the hardware configuration illustrated in FIG. 1.

According to the above-described configuration, an arbitrary position in a symbol string such as a character string may be changed in a specified arrangement order by executing the above-described information retrieval method and information retrieval program. By updating the symbol string group that includes this symbol string, the operations for the information retrieval may be reduced and the operation time and the retrieval time may be shortened.

Figure 24:
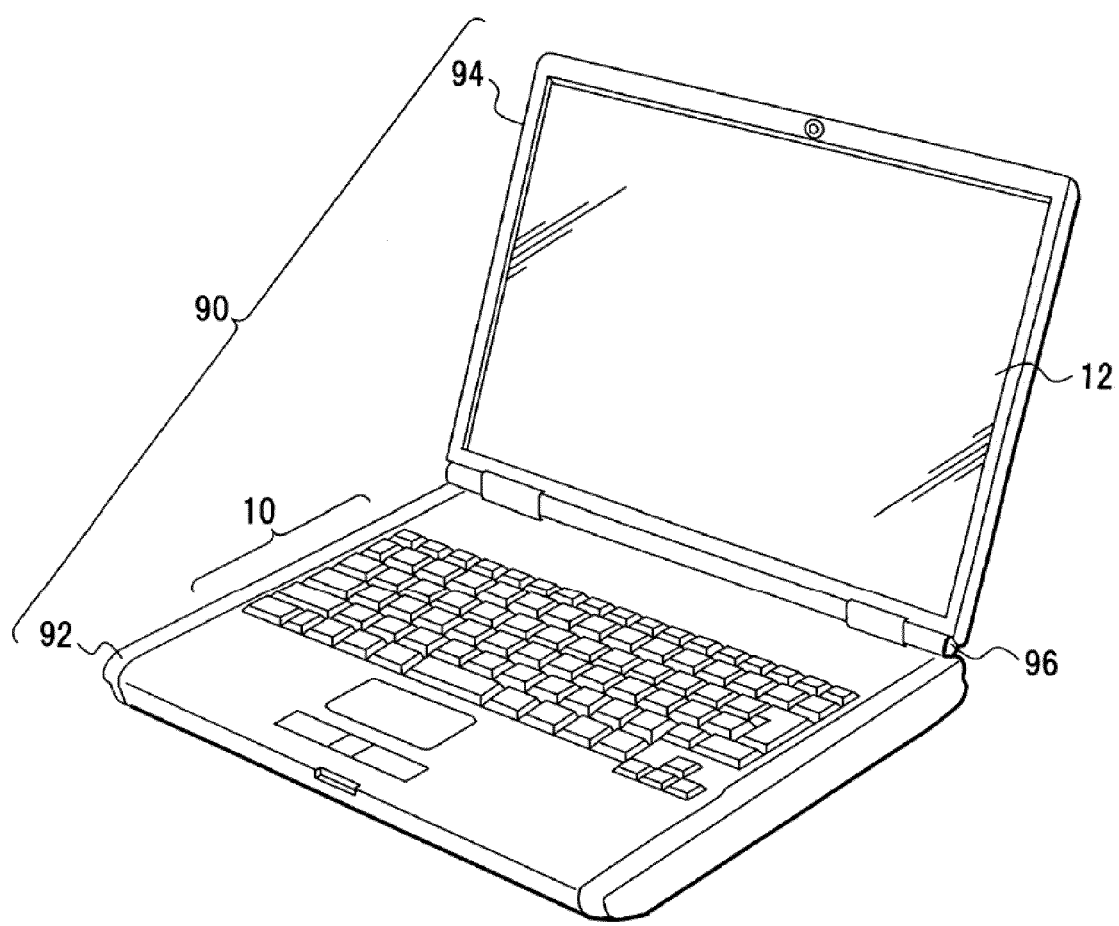
FIG. 24 is a diagram illustrating a PC according to another embodiment.

The PC 90 is an example of an electric apparatus and has a configuration in which a housing unit 92 and a housing unit 94 are linked together to be foldable by a hinge unit 69 as illustrated in FIG. 24. The housing unit 92 is provided with the operation input unit 10 composed of a keyboard and the like. The housing unit 94 is mounted with the display unit 12 and the functional unit indicated in the hardware configuration illustrated in FIG. 1.

According to the above-described configuration, in the PC 90, the arbitrary position in the symbol string such as a character string may be changed in the specified arrangement order by executing the above-described information retrieval method or the information retrieval program. Furthermore, by updating the symbol string group that includes the symbol string, the operations for the information retrieval may be reduced and the operation time and the retrieval time may be shortened.

(7) In the above-described embodiment, the position in the symbol string to be changed is specified by a numeric key. The position specification may be set in advance, and the change position may be set automatically. According to the above-described configuration, the key operation for the position specification may be omitted, the input operation may be reduced, and the input time and the retrieval time may be shortened.

That is, according to the present embodiment, the following advantages may be achieved.

(1) An arbitrary position in an input symbol string is specified, and the sign in the arbitrary position is changed. Thus, the symbol string is changed into a symbol string positioned before or after the symbol string in the specified arrangement order. Furthermore, the input operation and the change operation of the symbol string may be reduced.

(2) The input symbol string may be changed into a desired symbol string. Thus, the symbol string is not required to be re-input, so that the input operation may be reduced.

(3) At the time of retrieval of the symbol string, the retrieval may be performed from the input symbol string to the desired symbol string easily and quickly, so that the retrieval time of information may be shortened.

(4) As for a symbol string arranged in a specified arrangement order, for example, the number of words existing between two words to be retrieved may seem to be small according to a user. However, there may actually be many words between the two words. In this case, the character input is repeatedly performed, or many word selection operations are performed. According to the present embodiment, the number of the operations may be reduced. This may reduce the stress of a user. Furthermore, according to the present embodiment, the retrieval may be performed without reducing the time for the retrieval or requiring a character string to be re-input. Furthermore, according to the present embodiment, the speed of the list display of changed words may be increased.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An inputting method comprising:
 displaying a first symbol string and an indicator which indicates a designated symbol in the first symbol string on a display device;
 receiving input information indicating a direction;
 obtaining, by a computer, a list of symbol strings extracted based on a second symbol string, which is obtained by replacing the designated symbol of the first symbol string with another symbol;
 converting the designated symbol to the another symbol arranged at a position which is shifted toward the direction from a position of the designated symbol in a specific array of symbols; and
 displaying the obtained list in response to converting the designated symbol to the another symbol, wherein
 the symbols are characters,
 characters, which have same vowel, are arranged in a first direction in the certain array, and
 characters, which have same consonant, are arranged in a second direction in the certain array.

2. The inputting method according to claim 1, further comprising:
 further displaying another list of symbol strings, extracted based on the first symbol string,
 with the first string and the indicator.

3. The inputting method according to claim 1, wherein the symbol strings are information which is extracted from dictionary data stored in a recording medium or from address book data stored in a recording medium, or information which is extracted from the dictionary data used in a World Wide Web (Web) page or a text document or both.

4. An apparatus comprising:
 a display device that displays a first symbol string and an indicator which indicates a designated symbol in the first symbol string; and
 a processor that executes a procedure, the procedure including:
 receiving input information indicating a direction;
 obtaining, by a computer, a list of symbol strings extracted based on a second symbol string, which is obtained by replacing the designated symbol of the first symbol string with another symbol;
 converting the designated symbol to the another symbol arranged at a position which is shifted toward the direction from a position of the designated symbol in a specific array of symbols; and
 displaying the obtained list in response to converting the designated symbol to the another symbol, wherein
 the symbols are characters,
 characters, which have same vowel, are arranged in a first direction in the certain array, and
 characters, which have same consonant, are arranged in a second direction in the certain array.

5. The apparatus according to claim 4, wherein the display devices displays another list of symbol strings, extracted based on the symbol string,
 with the first symbol string and the indicator.

6. The apparatus according to claim 4, wherein the symbol strings are information which is extracted from dictionary data stored in a recording medium or from address book data stored in a recording medium, or information which is extracted from the dictionary data used in a World Wide Web (Web) page or a text document or both.

7. A non-transitory computer-readable recording medium storing a program, the program causing the computer to execute a process comprising:
 displaying, on a display device, a first symbol string and an indicator which indicates a designated symbol in the first symbol string;
 receiving input information indicating a direction;
 obtaining a list of symbol strings extracted based on a second symbol string, which is obtained by replacing the designated symbol of the first symbol string with another symbol;
 converting the designated symbol to the another symbol arranged at a position which is shifted toward the direction from a position of the designated symbol in a specific array of symbols; and displaying the obtained list in response to converting the designated symbol to the another symbol, wherein the symbols are characters, characters, which have same vowel, are arranged in a first direction in the certain array, and characters, which have same consonant, are arranged in a second direction in the certain array.

8. The non-transitory computer-readable recording medium according to claim 7, wherein the process further comprises:

displaying another list of symbol strings extracted based on the symbol string, with the first symbol string and the indicator.

9. The non-transitory computer-readable recording medium according to claim 7, wherein the symbol strings are information which is extracted from dictionary data stored in a recording medium or from address book data stored in a recording medium, or information which is extracted from the dictionary data used in a World Wide Web (Web) page or a text document or both.

* * * * *